(12) United States Patent
Sakamoto

(10) Patent No.: US 6,785,364 B1
(45) Date of Patent: Aug. 31, 2004

(54) SOUND SOURCE MANAGEMENT SYSTEM

(75) Inventor: Kunihiro Sakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/454,649

(22) Filed: Dec. 6, 1999

(30) Foreign Application Priority Data

Dec. 15, 1998 (JP) .......................................... 10-355796

(51) Int. Cl.$^7$ ................................................. H04M 1/64
(52) U.S. Cl. ........................ 379/87; 379/88.25; 379/134
(58) Field of Search ............................. 379/76, 88.25, 379/88.23, 88.22, 92.03, 133, 134, 87, 67.1

(56) References Cited

U.S. PATENT DOCUMENTS 4,757,525 A * 7/1988 Matthews et al. ....... 379/88.26
5,953,655 A * 9/1999 Oiwa ....................... 455/412.1

* cited by examiner

Primary Examiner—Fan Tsang
Assistant Examiner—Olisa Anwah
(74) Attorney, Agent, or Firm—Katten Muchin Zavis Rosenman

(57) ABSTRACT

A sound source management system for a telephone switching network is disclosed in which, in response to a sound source capturing request from a subscriber through a call processing unit, a sound source management unit drives an idle sound source detection unit to refer to a sound source management data storing unit, so as to detect an idle sound source connected to the own switching unit or connected to another switching units, and when an idle sound source is detected, the detected sound source is captured so that a sound from the captured sound source is sent to the subscriber, whereby a momentary resource shortage in each switching unit can be avoided economically and without affecting the traffic of the overall network.

2 Claims, 26 Drawing Sheets

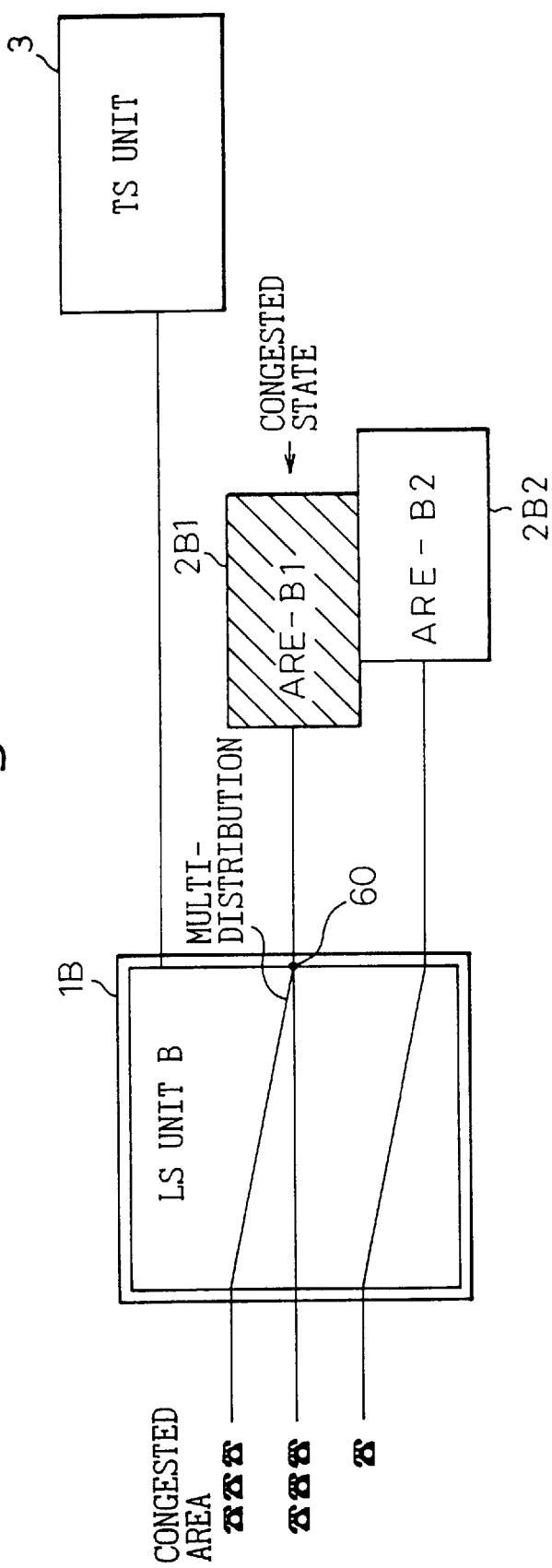

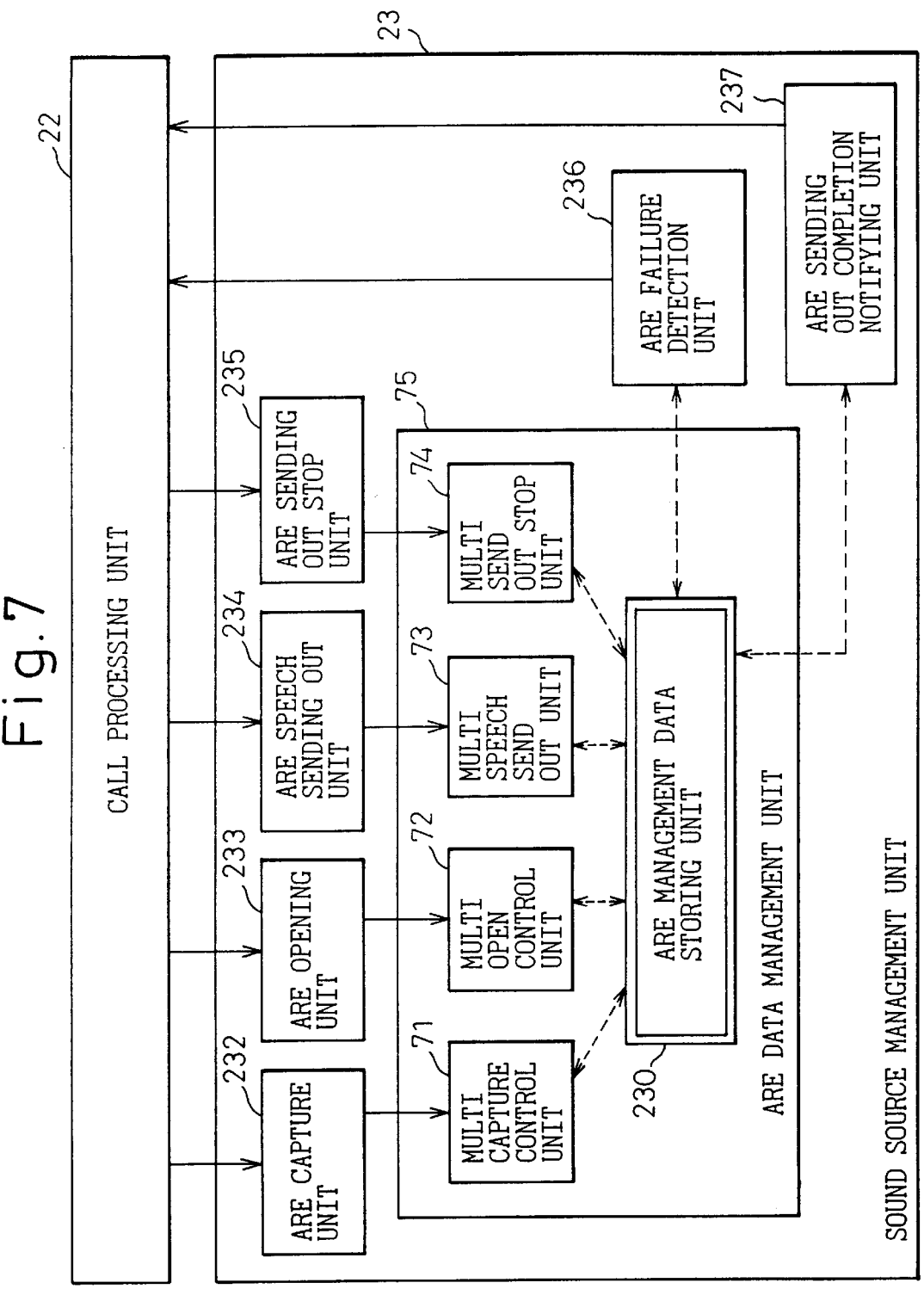

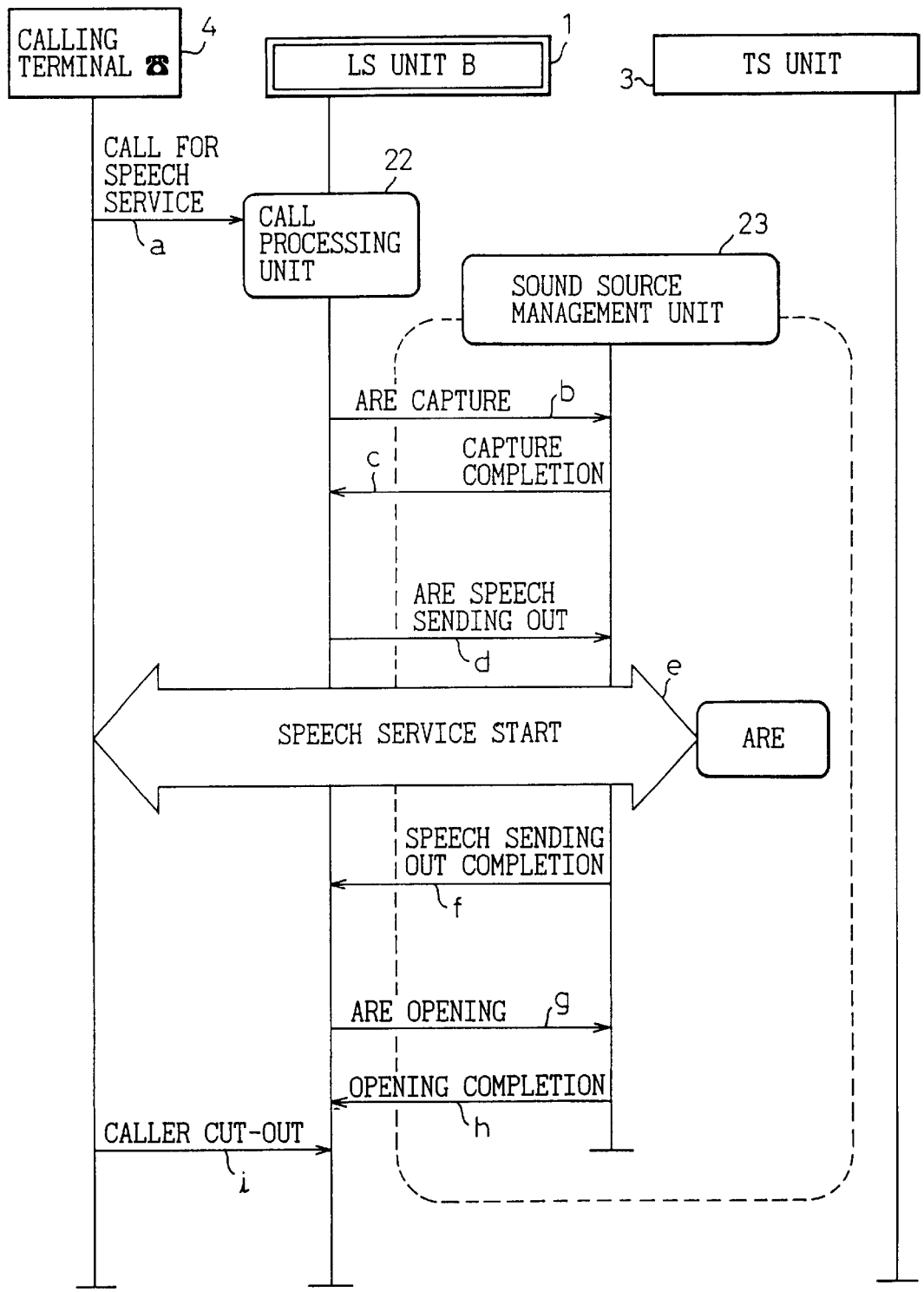

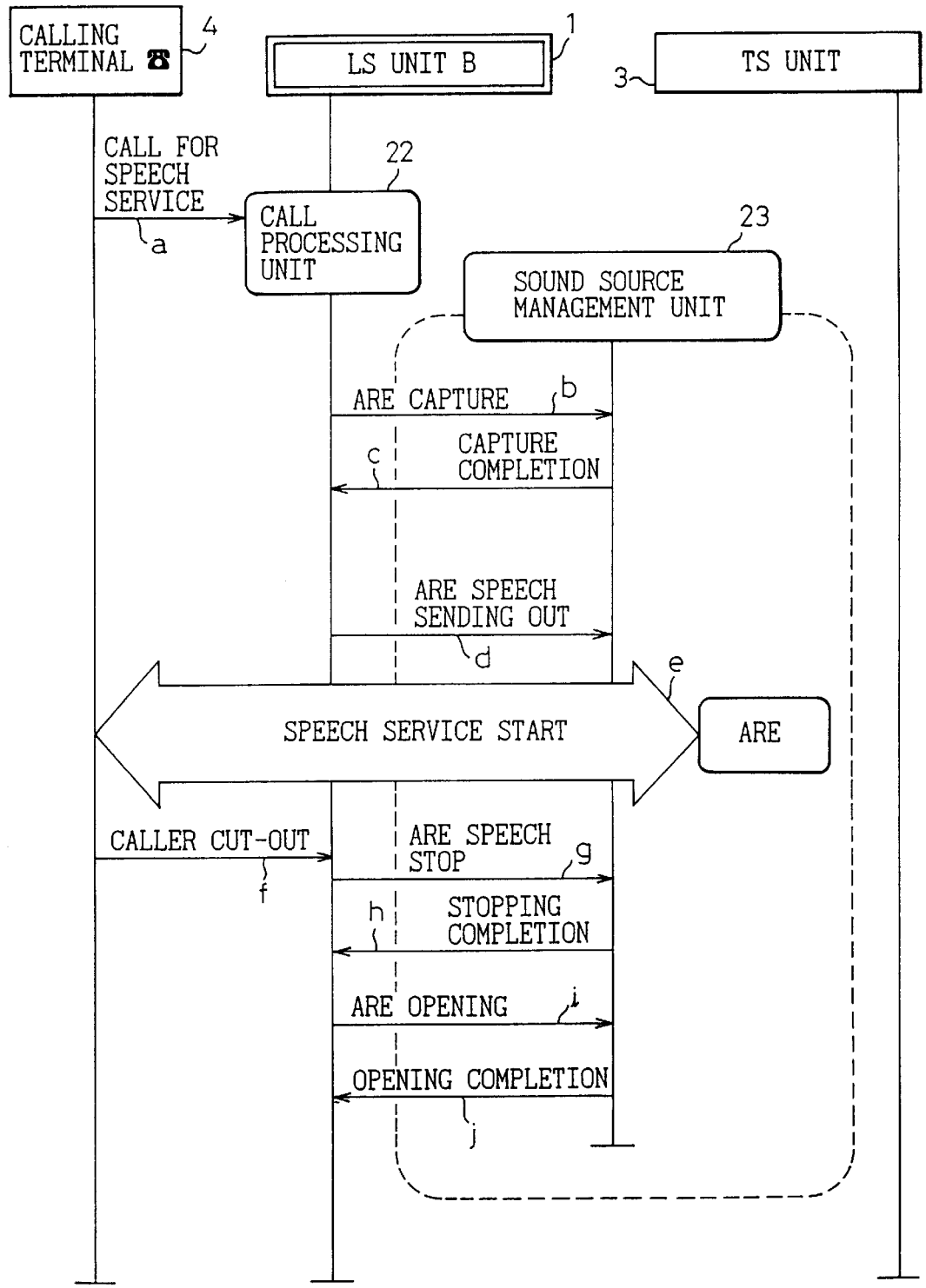

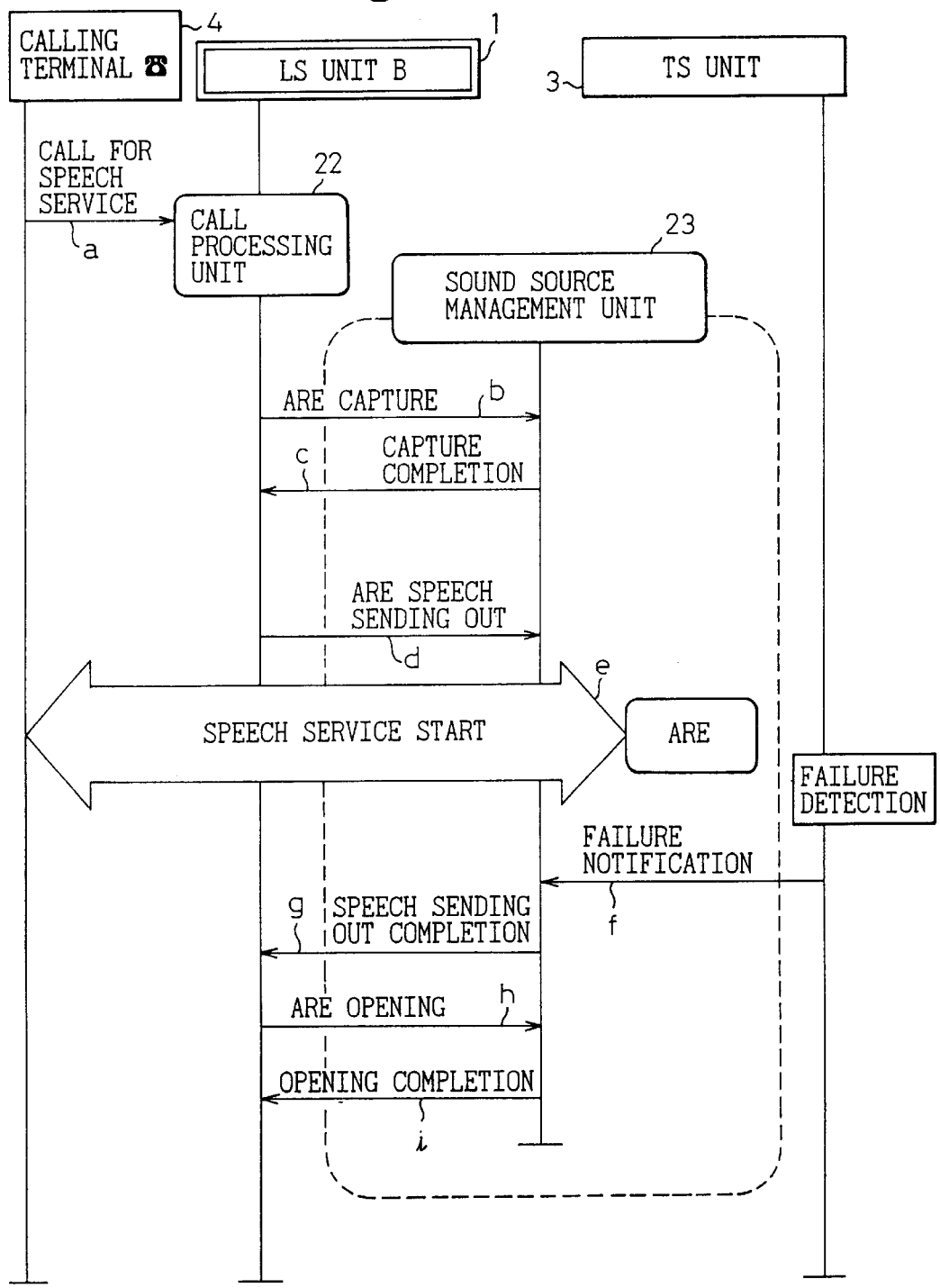
Fig.10 (No.3)

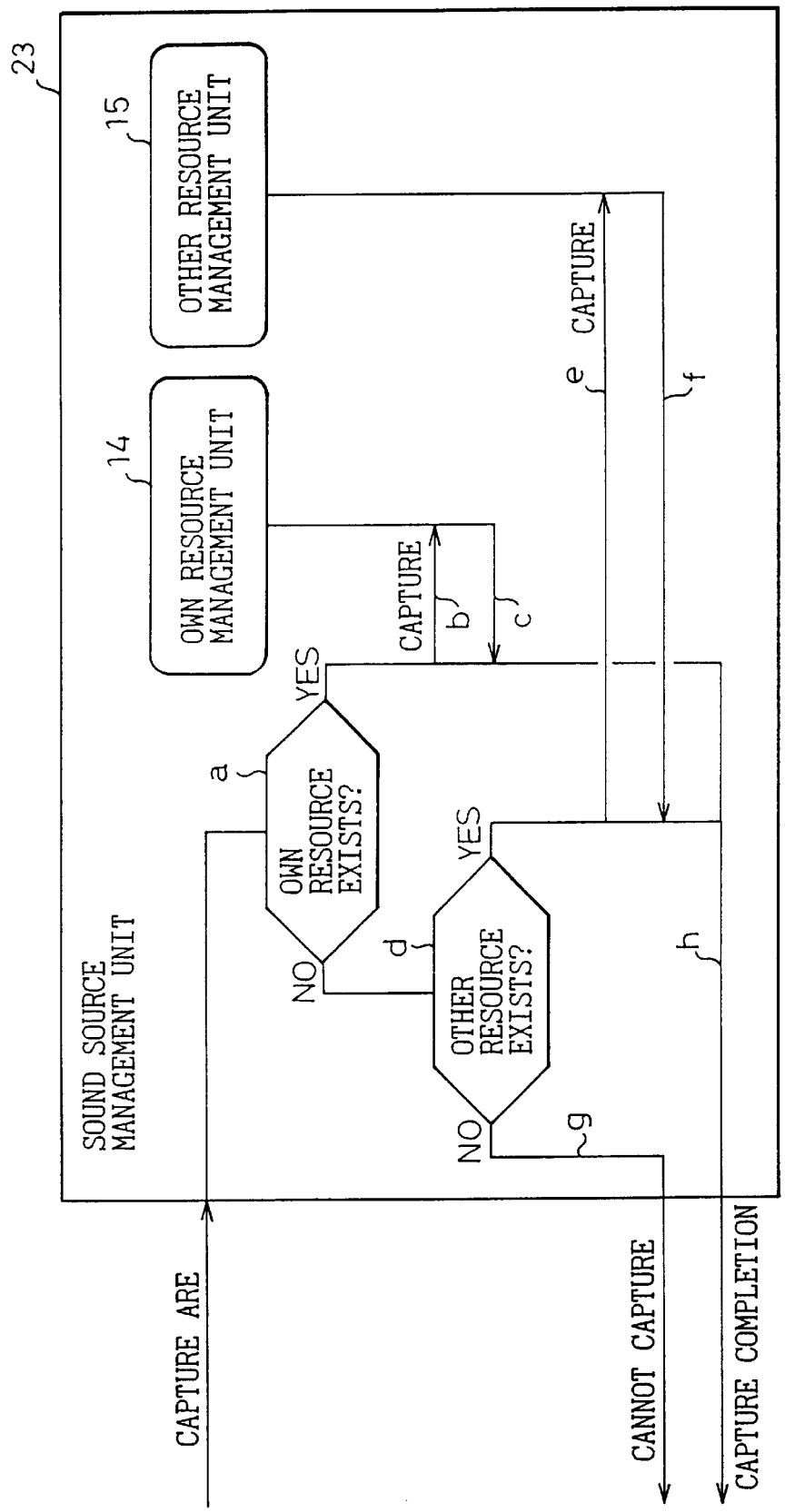

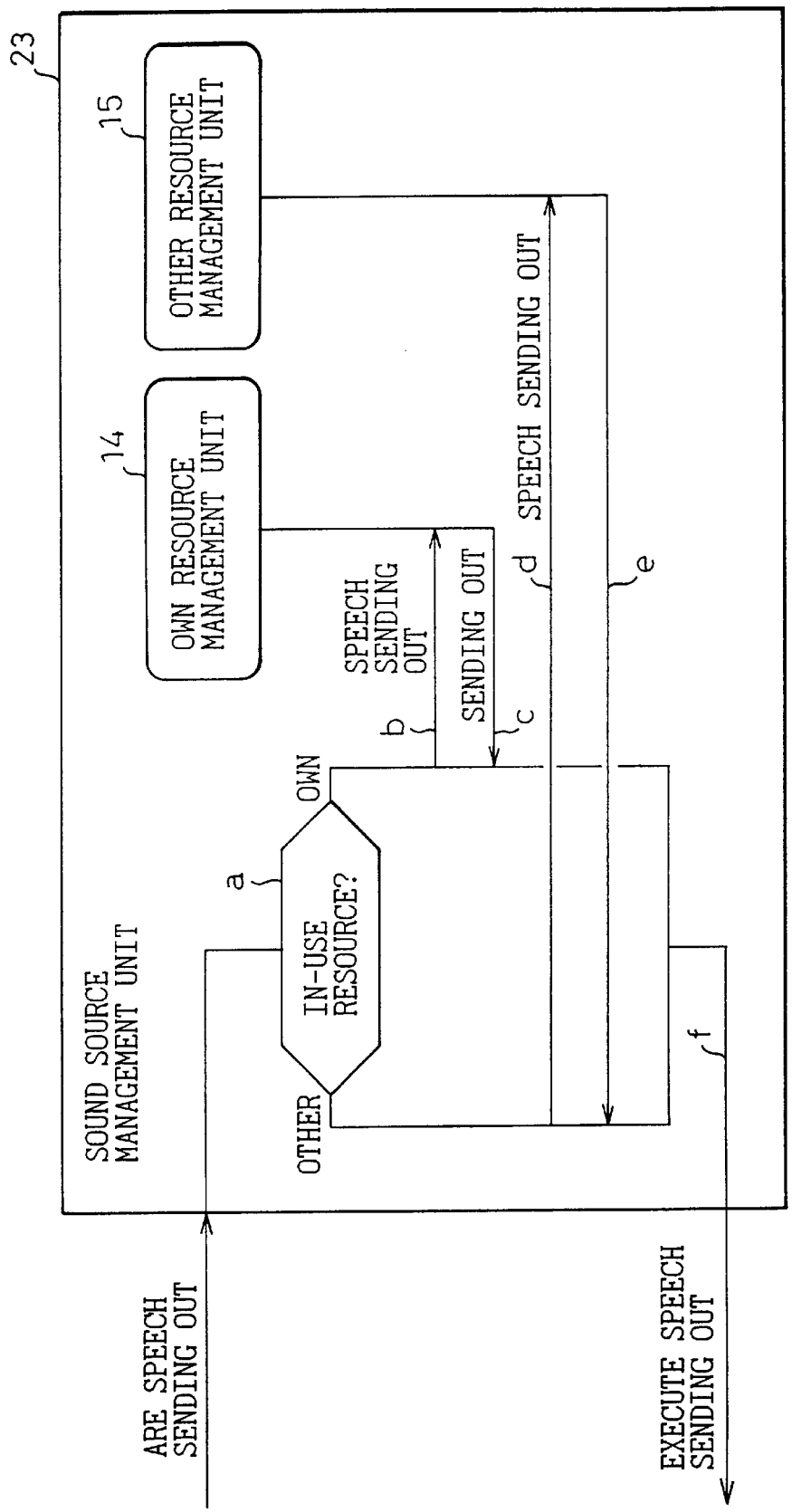

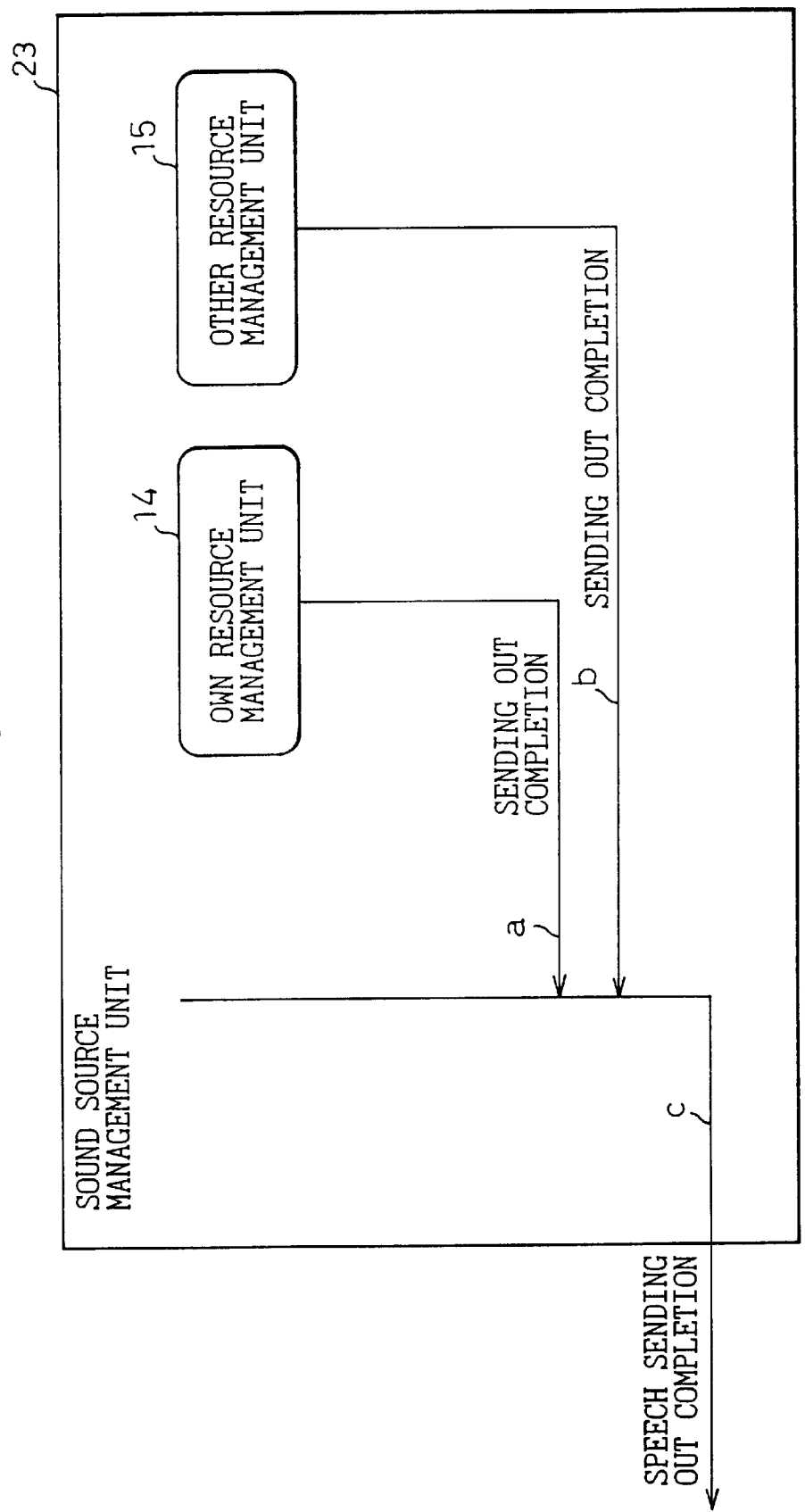

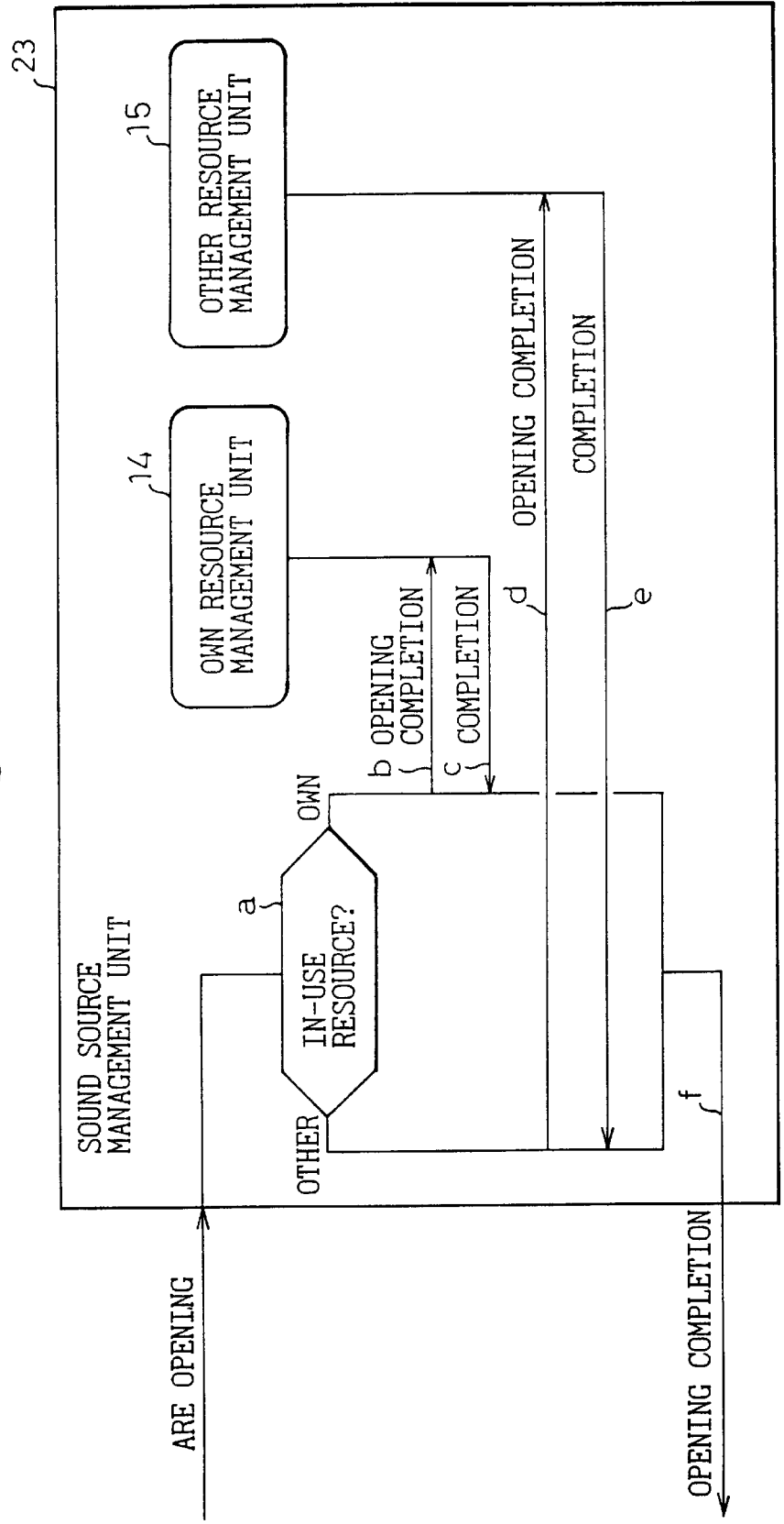

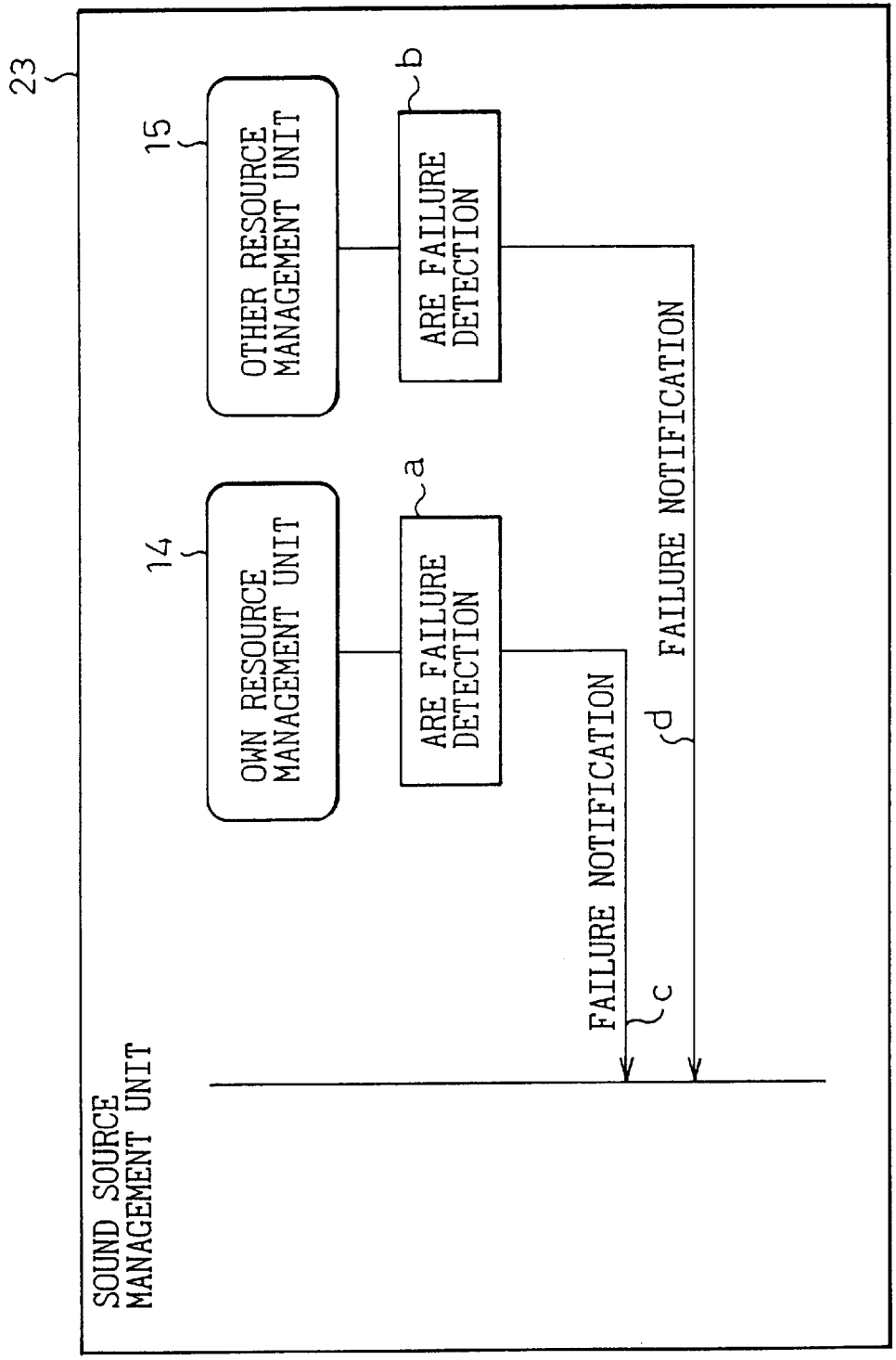

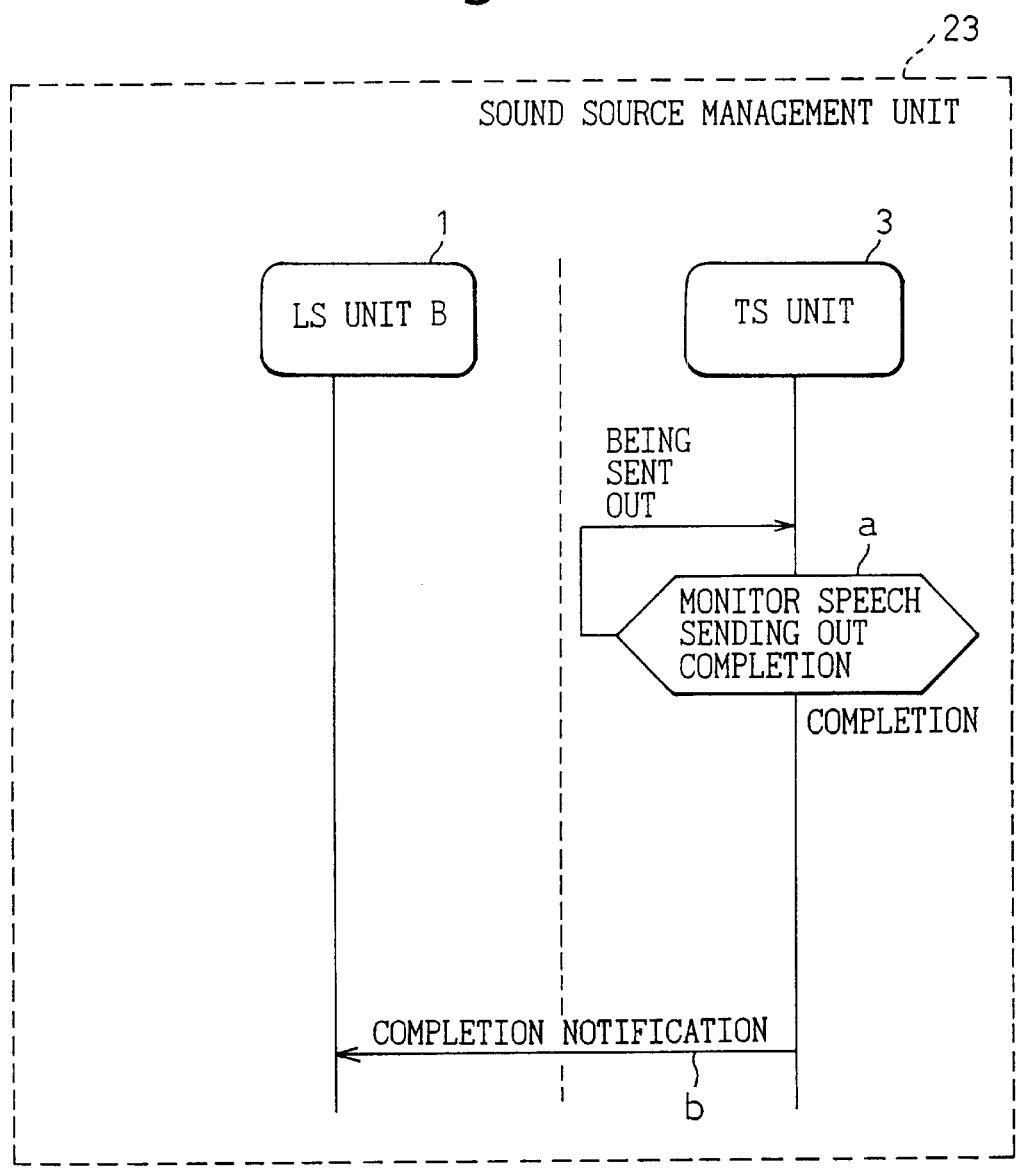

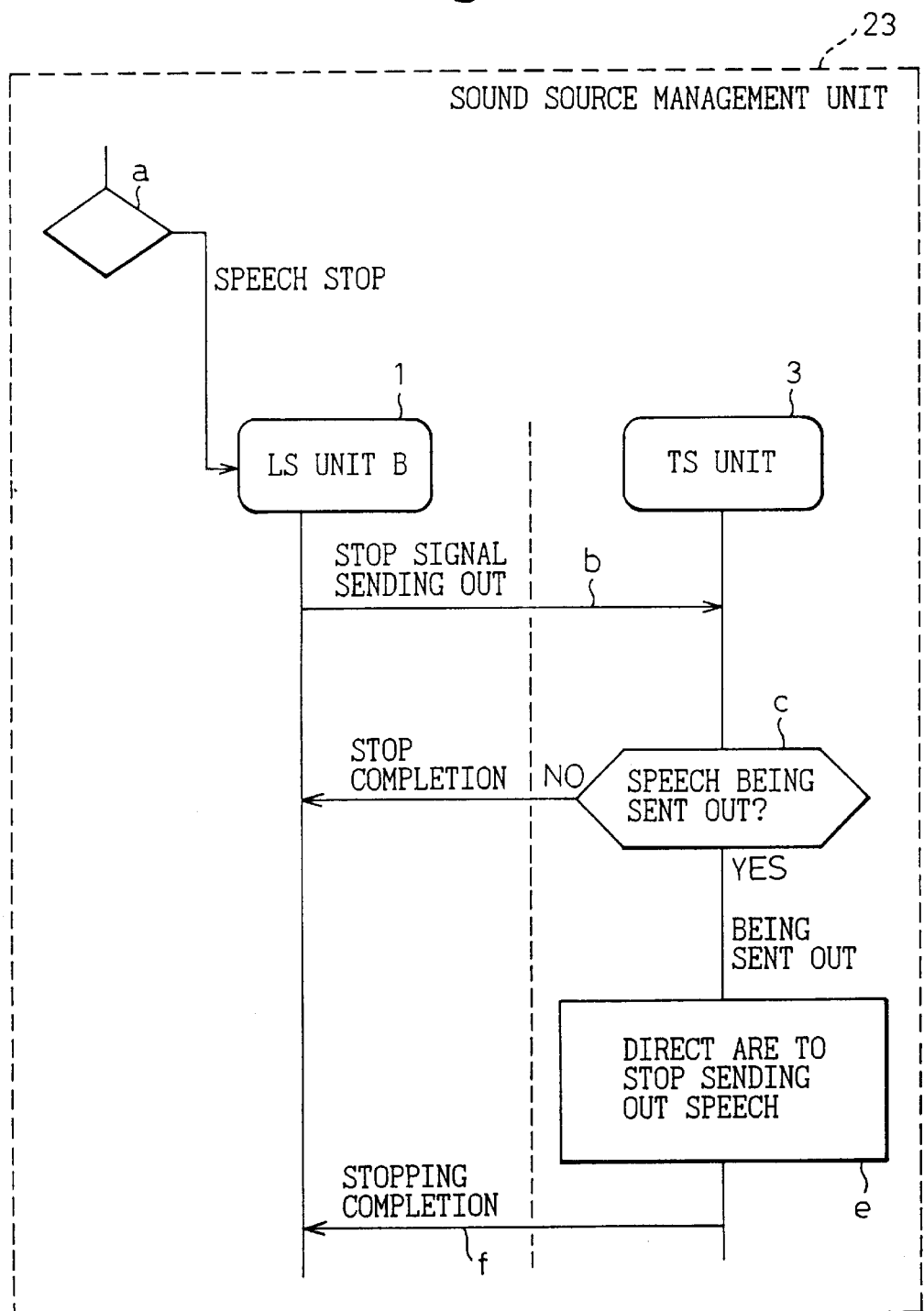

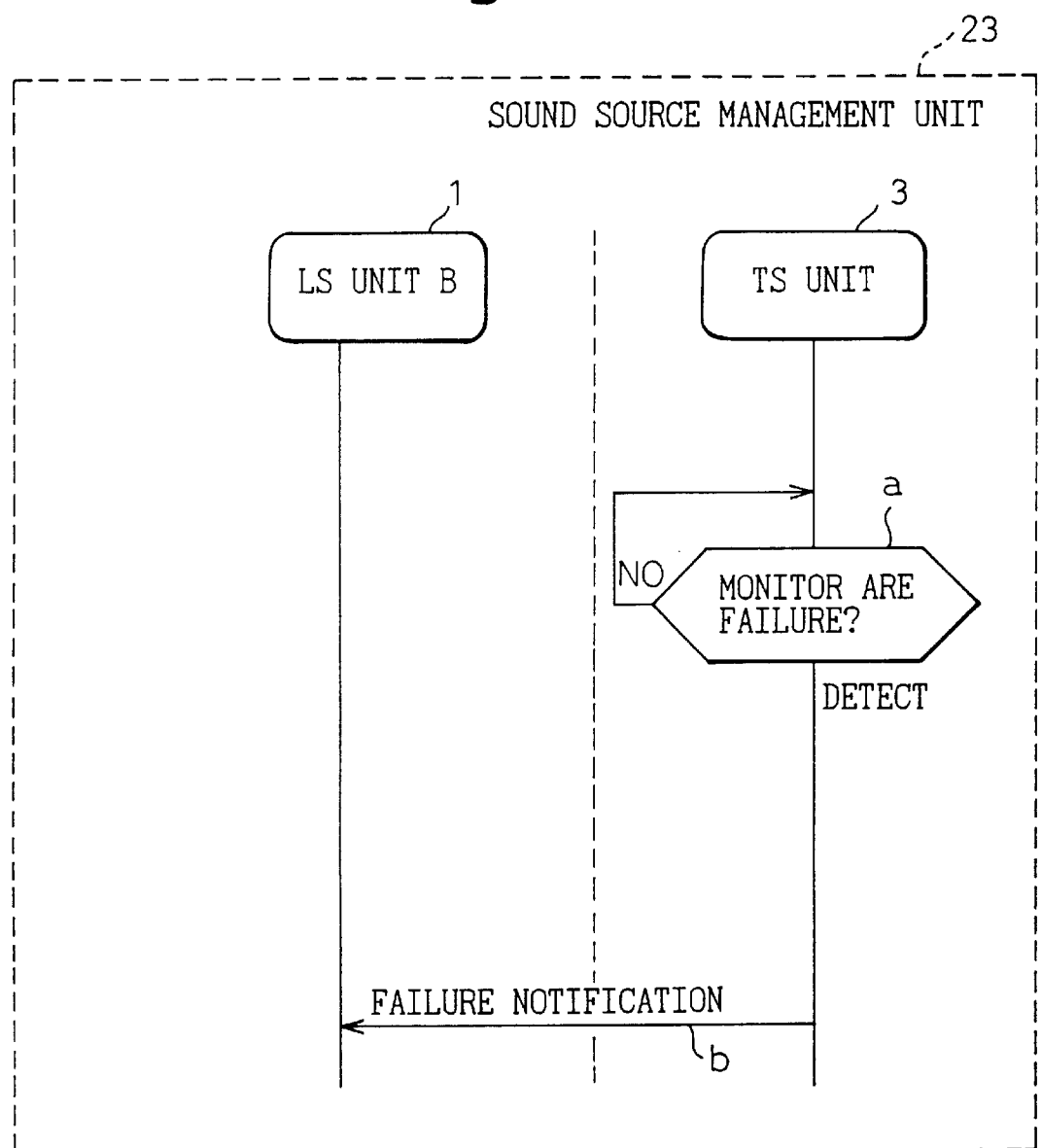

SOUND SOURCE MANAGEMENT SYSTEM

BACKGROUND OF THE INVENTION

1. Field of the Invention

The present invention relates to an audio response equipment. (sound resources) management system for a telephone switching network.

In a telephone switching network, various types of notices and/or services through speech are provided to users. With a view to realizing efficient services through speech (hereinafter, referred to as speech services), improvement in disposition of sound resources is desired.

2. Description of the Related Art

In a telephone switching network, various types of speech services are provided to users such as a time signal announcement message, a weather forecast announcement message, a congestion announcement message, an out-of-service area announcement message for a portable terminal, a dial Q2 for providing speech information and telephone voting, and the telephone switching network is expected to be used for further various types of services.

There are several methods for disposing sound source resources in order to realize conventional speech services and they will be described below by referring to FIGS. 18 to 20.

FIG. 18 is an example constructed such that an audio response equipment is concentratedly disposed at a center. In the figure, LS units are subscribers' or local switching units each accommodating a number of subscribers' telephone sets, TS's are transit switching units and an ARE (Audio Response Equipment) is a sound source device (or an audio response device) and in a description below, it is referred simply to a sound source or a sound source (ARE). In this construction example, the sound source (ARE) is connected to the speech center provided at a higher level than the plurality of transit switching units (TS). The. subscribers' telephones are each connected to the respective transit switching units (TS) via the respective local switching units (LS units), and then the sound source (ARE) is accessed via the speech center for supplying speech notices to the users of the subscribers' telephones. This system is characterized in that since the sound source device is concentratedly disposed, it is easy to manage the sound source, including the updating thereof, to provide complicated speech services, whereby the sound source can be disposed economically. However, this system is not suitable for use with high frequency and giving simple guidance (for instance, an announcement message for notifying a congested state) in that if there occurs a failure in the speech center, a large number of users will be affected and that a repeater network is used, on a call-by-call basis, from the local switching units (LS units).

FIG. 19 is an example constructed such that a single sound source is disposed so as to be distributed to a plurality of local switching units. In the figure, an LS unit is a local switching unit as in the case of the example shown in FIG. 18. In this example, a sound source device (ARE) is connected to the local switching unit (LS unit), and a plurality of subscribers (for instance, 60 subscribers) are connected to a single connecting point to the sound source (ARE). In this construction, a speech service can be provided without using a repeater network, and a direct notice is sent to a subscriber, this being suitable for a congestion announcement message. However, since the sound source is provided for each of the local switching units (LS units), this construction is disadvantageous in that considerable labor hours are needed when the speech in each sound source is to be changed or when new speech is to be added in each sound source. In addition, since the sound source continues to repeat the same speech, the construction is also disadvantageous in that the speech is not automatically started from the beginning thereof and hence the user hears the speech from the middle portion thereof when he/she is connected to the sound source (ARE). Thus, this construction is suitable for an announcement message providing no problem to the user even when he/she hears from the middle thereof (for instance, an announcement message for providing a time announcement).

FIG. 20 is an example constructed such that a plurality of sound sources are connected via a local switching unit to a plurality of subscriber's telephones on a one-to-one basis. In the figure, an LS unit and an ARE designate devices similar to those used in FIGS. 18 and 19, and a sound source (ARE) is individually connected to a connecting point of each circuit of the local switching unit (LS unit). In this system, a speech service can be provided to the user without using a repeater network and a speech can automatically be returned to the beginning thereof every time a call is received or on a call-by-call basis. However, this construction is disadvantageous in that, similar to the system shown in FIG. 19, considerable labor hours are needed to manage the sound source devices and that the sound source devices cannot be disposed in an economical fashion.

FIG. 21 shows a state in which speech services get congested. In a construction shown in FIG. 21, in a case where a number of call originating terminals A to E are going to receive a speech service all together, the call originating terminal E encounters a shortage of resource for a sound source, and it cannot receive a speech service. If the requested speech service is charged for, there is a problem in that when a subscriber encounters a shortage in resource for a sound source, a common carrier will fail to collect a charge for a call made from the subscriber.

In the system described with reference to FIG. 20, it is possible to avoid a congestion by increasing the number of the sound sources disposed in the local switching unit uniformly, but there remains a problem of a tremendous investment in equipment and facilities being required.

In the system shown in FIG. 19, the sound source is disposed for each local switching unit (LS unit) and this causes a problem of labor hours being required when the sound sources are to be modified. In addition, each sound source device continues to repeat the same speech and therefore since the user hears the speech from the middle thereof and the speech cannot automatically be returned to the beginning thereof when he/she is connected to the sound source device, the system is not suitable for a case in which the speech needs to be returned to the beginning thereof upon connection.

In the system shown in FIG. 18, since only a single sound source is disposed at the speech center, a congestion can be avoided economically. In this case, however, since a local congestion affects the traffic of the overall network, the number of speech services that are affected by failure at the speech center will be increased. Thus, there is a problem of lack of stability of a telephone switching network.

SUMMARY OF THE INVENTION

An object of the present invention is to provide a sound source management system that can solve the above problems and which can realize the avoidance of a momentary resource shortage in each of local switching units economically and without affecting the traffic of the overall network.

To attain the above object, there is provided, according to the present invention, a sound source management system for a telephone switching network, comprising: a sound source management data storing unit for storing information on sound sources of an own local switching unit and the other local switching units; and an idle sound source detection unit for detecting an idle sound source which is not being used as a sound source; wherein, in response to a sound source capturing request from a subscriber, the idle sound source detection unit refers to the sound source management data storing unit so as to detect an idle sound source connected to the own switching unit or connected to the other switching units, and when an idle sound source is detected, the detected sound source is captured so that a sound from the captured sound source is sent to the subscriber.

According to another aspect of the present invention, there is provided a sound source management system for a telephone switching network, comprising: a plurality of sound sources; a call processing unit for processing a call from at least one subscriber; and a sound source management data storing unit for storing information representing whether or not each of the sound sources is being used, wherein when the call processing unit detects a call originated from a calling subscriber's telephone set that requests connection to one of the sound-sources, the call processing unit judges, through the utilization of the sound source management data storing unit, whether or not a speech is being sent out from the sound source identical to that required; and as a result of the judgement, if the speech is being sent out from the required sound source to another subscriber's telephone set, the call processing unit establishes a path between the call originating subscriber's telephone set and the required sound source in addition to the path between the another subscriber's telephone set and the required sound source.

BRIEF DESCRIPTION OF THE DRAWINGS

The above object and features of the present invention will be more apparent from the following description of the preferred embodiments, wherein:

FIG. 6 is a diagram showing a construction of a sound source management system according to a third example of the present invention;

FIG. 7 is a diagram showing a construction of a control unit in a local switching unit in the system shown in FIG. 6;

FIG. 8 is a diagram showing a process sequence (No. 1) of an embodiment for realizing the construction of the sound source management system of the first embodiment shown in FIG. 4;

FIG. 9 is a diagram showing a process sequence (No. 2) of an embodiment for realizing the construction of the sound source management system of the first embodiment shown in FIG. 4;

FIG. 10 is a diagram showing a process sequence (No. 3) of an embodiment for realizing the construction of the sound source management system of the first embodiment shown in FIG. 4;

FIG. 11A is a diagram showing a process flow (No. 1) of a capturing process by an sound source management unit;

FIG. 11B is a diagram showing a process flow (No. 1) of a speech sending process by the sound source management unit;

FIG. 12A is a diagram showing a process flow (No. 2) of a speech sending completion process by the sound source management unit;

FIG. 12B is a diagram showing a process flow (No. 2) of a speech sending completion process by the sound source management unit;

FIG. 13B is a diagram showing a process flow (No. 3) of a failure notification process by the sound source management unit;

FIG. 15A is a diagram showing a sequence (No. 2) of a speech sending out completion process between nodes of the resource management unit;

FIG. 15B is a diagram showing a sequence (No. 2) of a speech stop process between nodes of the resource management unit;

FIG. 16B is a diagram showing a sequence (No. 3) of a failure notification process between nodes of the resource management unit;

DESCRIPTION OF THE PREFERRED EMBODIMENTS

Figure 1:
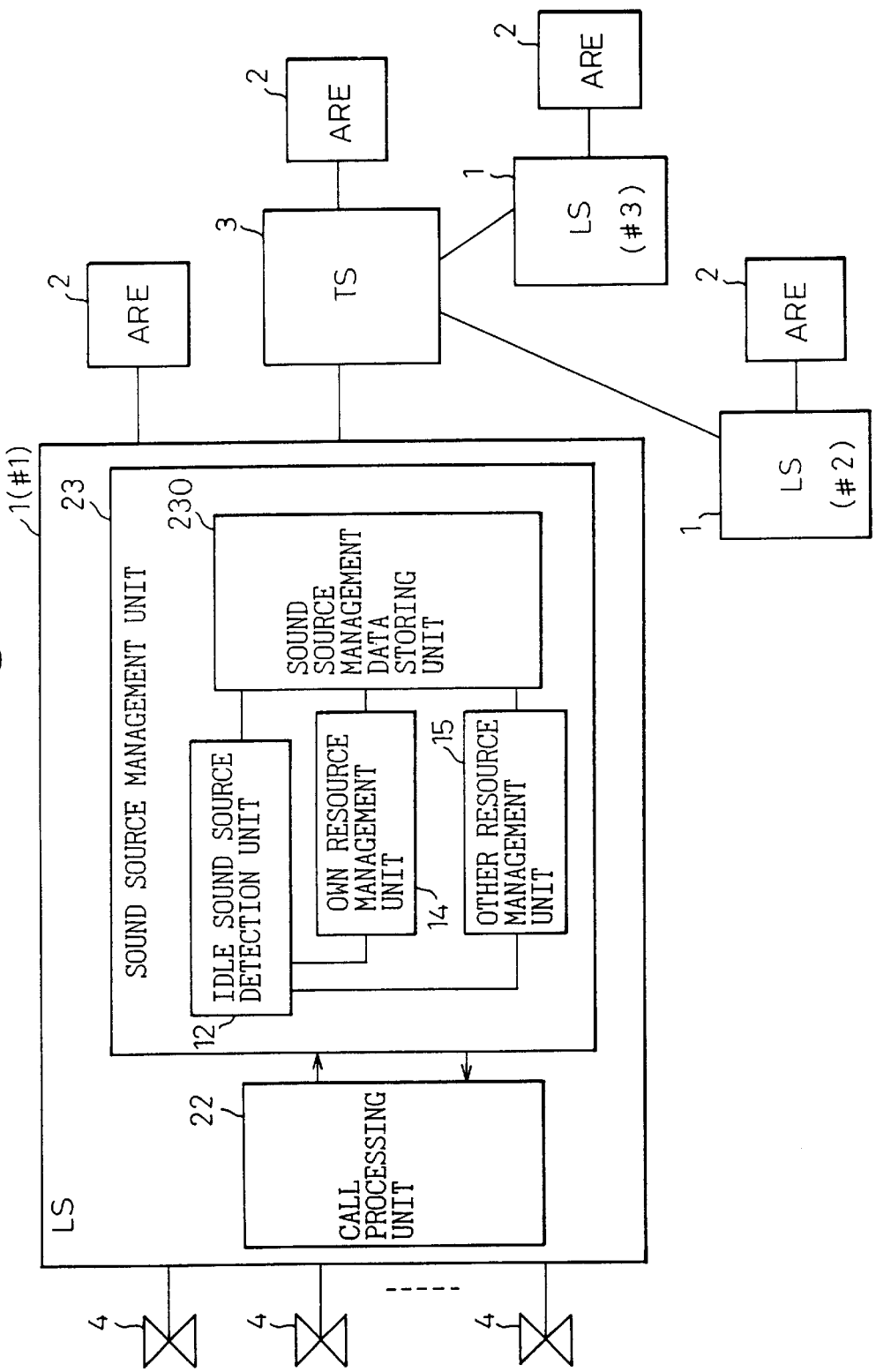
FIG. 1 is a diagram showing a principle construction of a sound source management system according to the present invention.

FIG. 1 is a drawing showing a principle construction of a sound source management system according to the present invention. In the drawing, reference numeral 1 denotes a local switching unit (LS), and in FIG. 1 there are disposed three local switching units (LS #1 to #3)1, and a transit switching unit (TS)3. Each of the local switching units (LS) includes units 22 and 23. The unit 23 includes units 12, 14, 15 and 230. That is, reference numeral 22 denotes a call processing unit for processing a call from a subscriber, reference numeral 23 a sound source management unit for managing sound sources (ARE)2, reference numeral 12 an idle sound source detection unit for detecting an idle sound source which is not being used as a sound source, reference numeral 230 a sound source management data storing unit for storing therein management data on the state of the sound source (ARE)2 connected to the own local switching unit (#1)1, and the sound sources (ARE)2 connected to the other local switching units (#2 and #3)1 and to the transit switching unit 3, and accommodating positions of those sound sources, reference numeral 14 an own resource management unit for managing the sound source (ARE)2 connected to the own local switching unit (#1)1, reference numeral 15 an other resource management unit for managing sound sources connected to the other local switching units (#2 and #3)1 and connected to the transit switching unit (TS)3, and reference numeral 4 subscribers (subscriber's telephone terminals).

According to the present invention, not only the sound source 2 connected to the own local switching unit (#1)1 but also sound sources 2 connected to the other local switching units (#2 and #3)1 and the transit switching unit (TS)3 are commonly managed, whereby the sound sources can be disposed economically and flexibly enough to cope with a congestion.

In FIG. 1, the sound sources 2 are accommodated in the respective local switching units (#1 to #3)1 and to the transit switching unit 3. Each of the local switching units 1 comprises the call processing unit 22 and the sound source management unit 23.

In operation, when a call is generated from one of the subscriber's terminals 4, the call processing unit 22 carries out a certain process, and when there is caused a need for a sound source to be connected, the call processing unit 22 sends a request for the sound source to be captured is sent to the sound source management unit 23, whereby the idle sound source detection unit 12 is driven to retrieve the sound source management data storing unit 230 for detection of an idle sound source i.e., connectable circuit to the idle sound source. To do this, first the sound source management data storing unit 230 in the own switching unit (#1)1 is retrieved for an idle sound source, and when there is no idle sound source in the own local switching unit (#1)1, then, the other switching units i.e., the transit switching unit 3 and the other local switching units (#2 and #3)1 via the transit switching unit 3, are retrieved to find an idle sound source. As a result of retrievals, when there is detected an idle sound source accommodated in the own local switching unit (#1)1, then the own resource management unit 14 is driven so as to control to capture the detected idle sound source accommodated in the own local switching unit (#1)1. On the other hand, as a result of the retrievals, when an idle sound source accommodated in any one of the other switching unit is detected, then the other resource management unit 15 is driven so as to control to capture the detected idle sound source accommodated in the other switching unit.

When an idle sound source is captured, sound source information on the captured sound source, i.e., the information on the switching unit and position of a circuit accommodating the sound source so captured, is sent to the call processing unit 22. The call processing unit 22 then processes the notice so sent to thereby connect the circuit of the calling subscriber to the circuit of the sound source.

As a mode of connecting from the local switching unit 1 (#1) to the sound source 2 accommodated in another switching unit, there are two cases; one case is where the sound source accommodated in the transit switching unit 3 is connected, and the other case is where the sound source 2 accommodated in the other local switching unit (#2 or #3)1 is connected to through a connection of the transit switching unit 3 to the other local switching unit (#2 or #3)1. In addition, in a state a subscriber is connected to the sound source 2 accommodated in the local switching unit 1 on a one-to-one basis, when another subscriber calls the same sound source 2 so that a congestion is generated in the sound source 2, the sound sources can be secured by modifying the connection to a multi-distribution (a plurality of subscribers are connected to a terminal connected to the single sound source).

The contents of the information of the sound sources in the local switching unit 1 (especially, state information) is updated when there occurs a change in the states of the sound sources, and the sound source management data storing unit 230 gets the latest information on the state of the sound sources accommodated in the other switching units for reference by inquiring the other switching units as to the states of their sound sources or being notified thereof by the other switching units.

Figure 2:
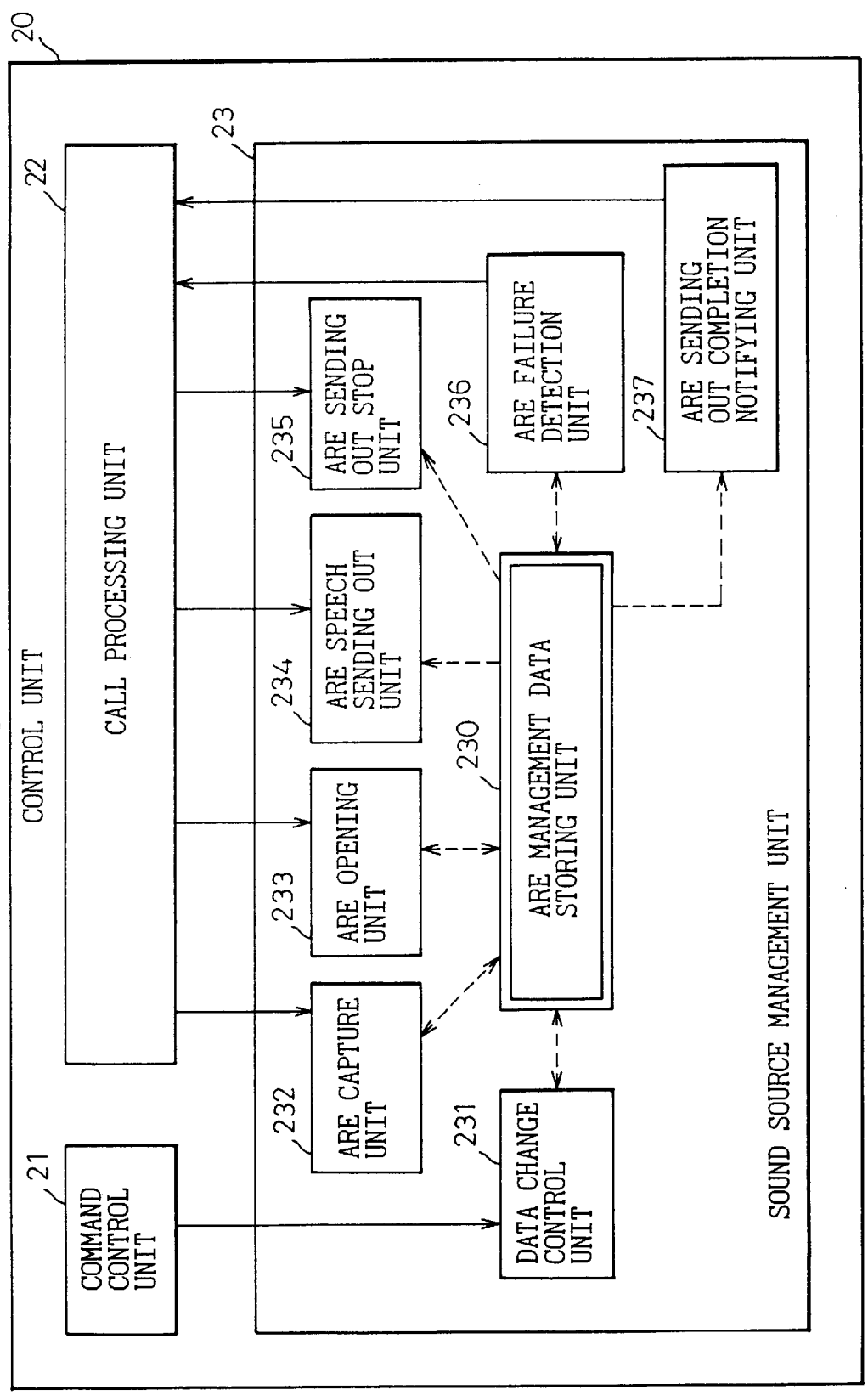
FIG. 2 is a diagram showing a detailed construction of a control unit in a local switching unit according to an embodiment of the present invention.
Figure 3:
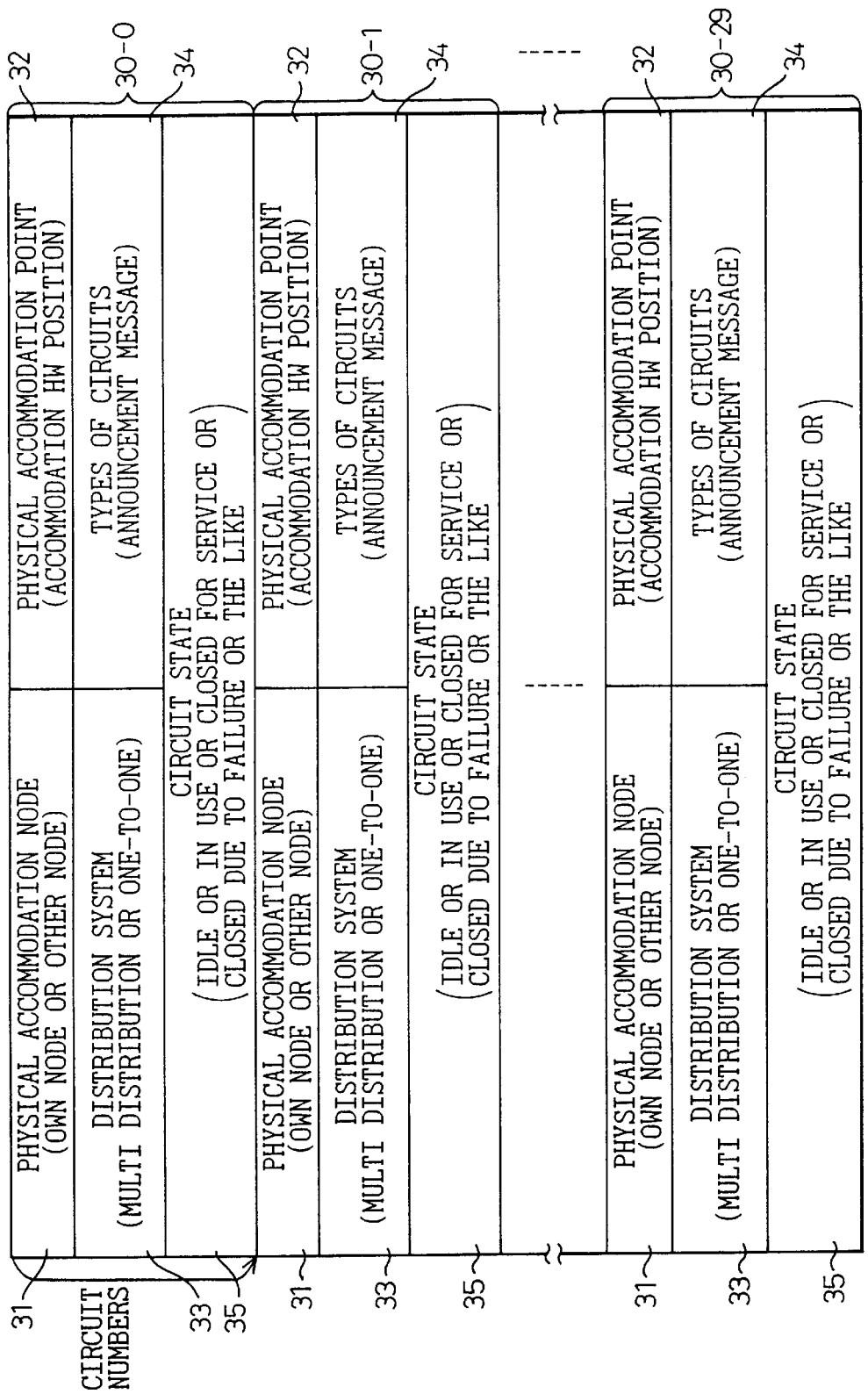
FIG. 3 is a diagram showing a construction of management data of an ARE (sound source) in the system shown in FIG. 1.

FIG. 2 shows a detailed construction of a control unit in a local switching unit according to an embodiment of the present invention, and FIG. 3 shows a construction of management data stored in the sound source management storing unit 230. The same reference numerals in FIG. 1 and FIG. 2 represent the same parts.

FIG. 2 shows mainly a construction for resource management of the sound sources (ARES) in a control unit of a local switching unit. In FIG. 2, reference numeral 20 denotes a control unit, 21 a command control unit for controlling commands for managing an audio response equipment (ARE) management data storing unit 230, 22 the call processing unit, 23 the sound source management unit for carrying out control operations upon receipt of a request from the call processing unit such as capturing and opening a sound source and sending a speech, 230 the sound source management data storing unit for storing therein management data on accommodating nodes, accommodating positions and states of the own and other switching units, 231 a data change control unit for controlling to change information, i.e., information shown in FIG. 3 that will be described later and including disposition information, state information and types of the respective sound sources (ARE) through control by the above command control unit 21, 232 an ARE capture unit for performing a control upon receipt of a request from the call processing unit 22 so as to capture an ARE, 233 an ARE opening unit for performing a control so as to open an ARE after the use thereof is completed, 234 an ARE speech sending-out unit, 235 an ARE sending-out stop unit, 236 an ARE failure detection unit and 237 an ARE sending-out completion notifying unit.

A construction of the ARE management data stored in the ARE management data storing unit 13 is shown in FIG. 3. In the figure, 30-0, 30-1, . . . , 30-29 each denote management data of sound sources corresponding to respective circuit numbers, and these management data are divided into two, although-not shown in the figure; 30-0 to 30-9 are management data for sound sources accommodated in the own switching unit and 30-10 to 30-29 are management data of sound'sources accommodated in the other switching units, i.e., a transit switching unit and other local switching unit. Each management data comprise data designated by reference numerals 31 to 35, and reference numeral 31 denotes a physical accommodating node (the own switching unit, i.e., the own node, or, other node of the transit switching unit or other local switching unit accommodated in the transit switching unit), 32 a physical accommodation point (position of a highway accommodating a sound source), 33 a distribution system (a multi-distribution or a one-to-one connection), 34 a types of circuits (types of option announcement message, congestion announcement message or out-of-service area announcement message), and 35 represents a circuit state (idle, in use, closed for maintenance or closed due to failure).

In the present invention, at least one sound source (ARE) is provided for each of a plurality of local switching units (LS) and at least one sound resource (ARE) is also provided for a transit switching unit (TS) provided at a higher order than the plurality of local switching units (LS). Information of the sound sources (ARE) accommodated in not only the own switching unit (LS) but also the other switching units (the transit switching unit (TS) and the other local switching units (LS) connected via the transit switching unit) is stored in the ARE management table as shown in FIG. 3, and any one of the sound sources accommodated in the other switching units may be used as a sound source (ARE) of the own local switching unit. First to third examples for the management of the sound sources according to the present invention will be shown in FIGS. 4 to 6. The third example shown in FIG. 6, however, shows only sound sources accommodated in the own local switching unit.

Figure 4:
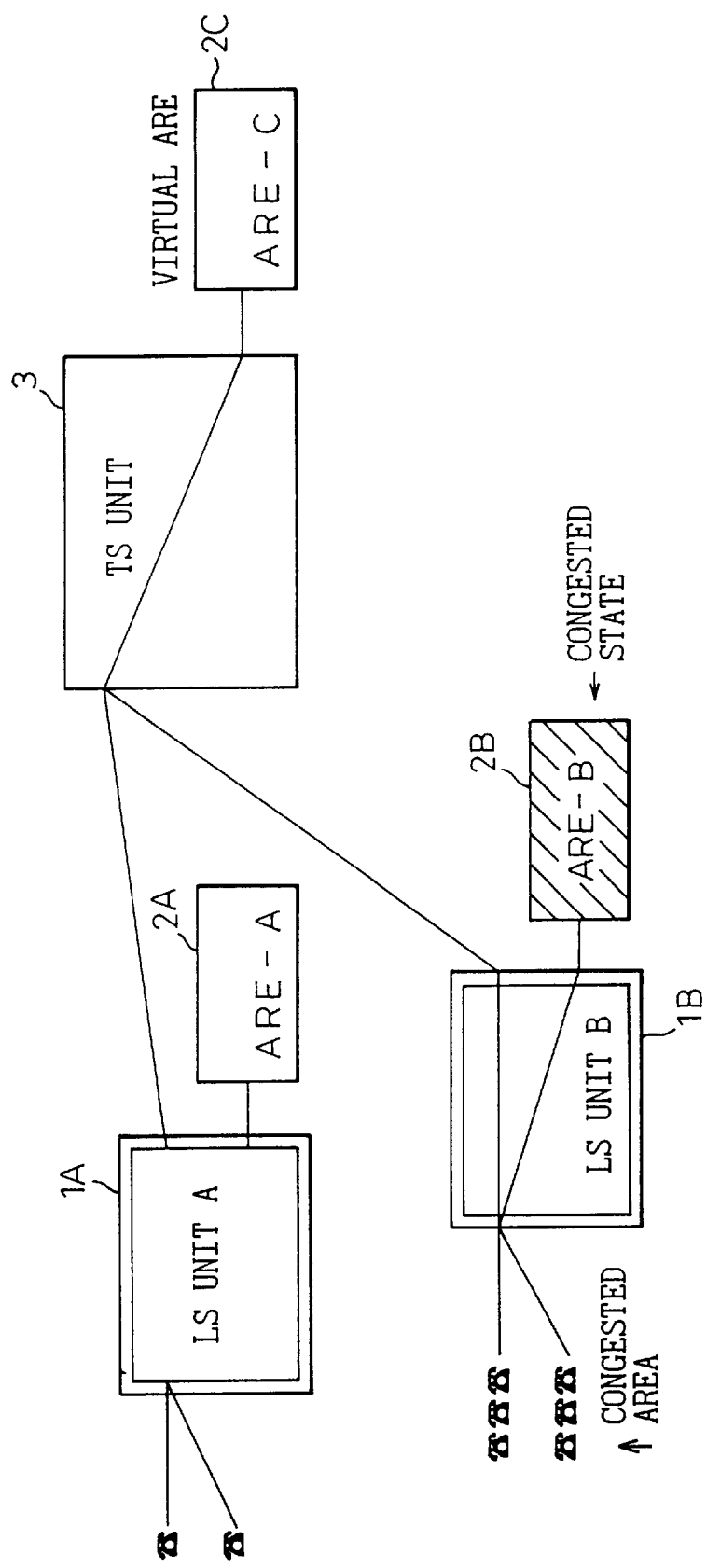
FIG. 4 is a diagram showing a construction of a sound source management system according to a first example of the present invention.

In the construction of the sound source management system of the first example shown in FIG. 4, a sound source (ARE-C)2C is accommodated in a transit switching unit 3, and in the figure, reference numerals 1A and 1B respectively denote a local switching unit A (denoted by LS unit A) and a local switching unit B (denoted by LS unit B), reference numerals 2A, 2B and 2C respectively denote sound sources ARE-A, ARE-B and ARE-C respectively accommodated in the local switching unit 1A, the local switching unit 1B and the transit switching unit 3, and reference numeral 3 denotes the transit switching unit (denoted by TS unit).

In FIG. 4, subscriber's telephone sets in an area covered by the local switching unit 1B. (LS unit B) are congested and hence the sound source 2B accommodated in this switching unit is congested. In this case, when a sound source capture request is generated and sent to the local switching unit 1B, it is detected that the sound source 2B accommodated in the own local switching unit is not an idle sound source through control by the sound source management unit 23, and the sound source 2C accommodated in the transit switching unit 3 is detected as an idle sound source and the idle sound source is captured, whereby the subscriber's telephone set accommodated in the local switching unit 1B is connected to the sound source 2C accommodated in the transit switching unit 3.

Figure 5:
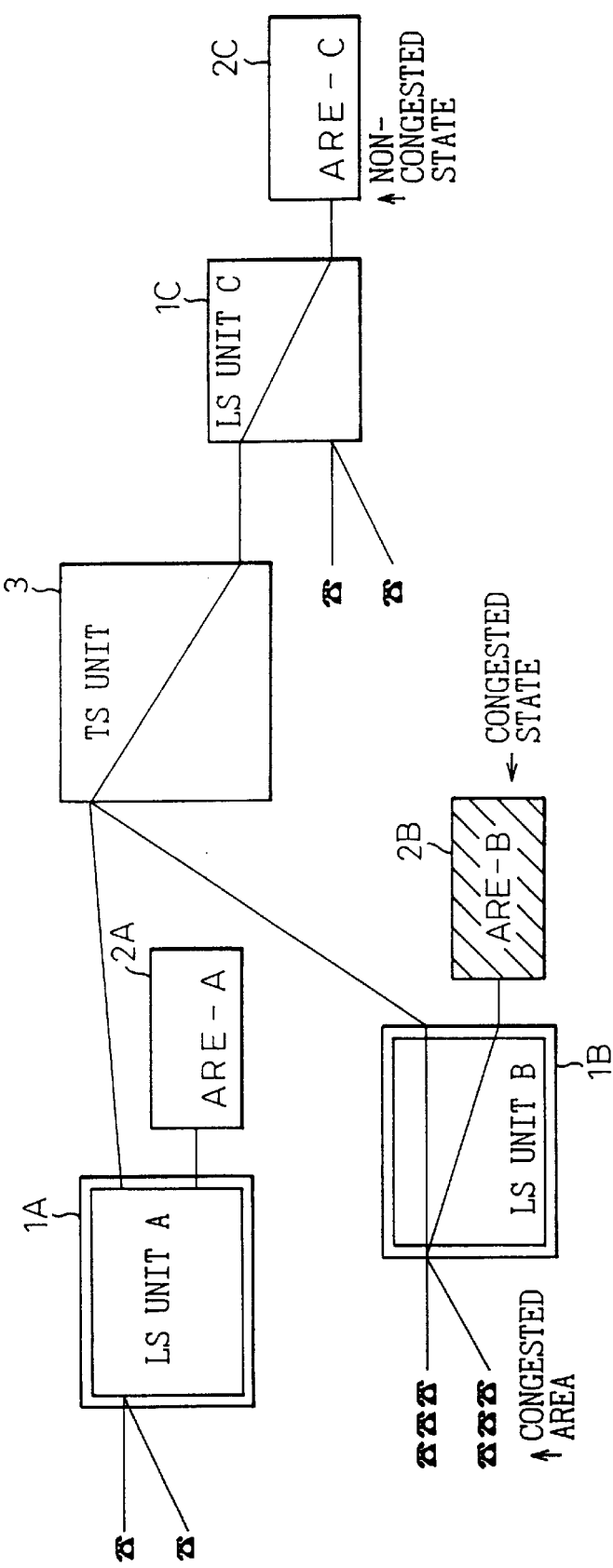
FIG. 5 is a diagram showing a construction of a sound source management system according to a second example of the present invention.

In the construction of the sound source management system of the second example shown in FIG. 5, reference numerals 1A, 1B, 2A, 2B and 3 correspond to the like reference numerals used in FIG. 4 above, and therefore a description thereabout will be omitted here. Reference numeral IC denotes another local switching unit (denoted by LS unit C) connected to the transit switching-unit 3, and reference numeral 2C denotes a sound source (denoted by ARE-C) accommodated in the local switching unit IC. In FIG. 5, the sound source (ARE-C)2C is used which is accommodated in another local switching unit 1C connected to the transit switching unit 3.

In the case shown in FIG. 5, as in the case shown in FIG. 4, the subscriber's telephone sets in the area covered by the local switching unit 1B are congested and hence the sound source 2B is congested. In this case, when there occurs a sound source capture request, it is detected that there is no idle sound source available because the sound source 2B accommodated in the own local switching unit 1B is in a congested state and then it is detected that there is an idle sound source available in the sound source 2C accommodated in another local switching unit 1C, the sound source 2C being then captured, whereby the subscriber circuit of the local switching unit 1B is connected to the sound source 2C of the local switching unit 1C via the transit switching unit 3.

Next, the construction of the sound source management system shown in FIG. 6 is a third example in which two sound sources 2B1 (ARE-B1) and 2B2 (ARE-B2) are accommodated in a local switching unit 1B (LS unit B).

First the sound source 2B1 is connected to a single subscriber's telephone set, i.e., it is connected to the subscriber circuit in the form of one-to-one connection.

Thereafter, when another subscriber's telephone set generates a call to the same sound source 2B1, the sound source 2B1 gets congested with calls because connecting requests to the sound source 2B1 are increased. In this case, the another subscriber's telephone set is connected to a terminal 60 in which the circuit of the sound source 2B1 is accommodated, using a multi-distribution type connection. In this case, the other sound source resource 2B2 provided for the local switching unit 1B is secured as a sound source that can be used (in an idle state).

FIG. 7 shows a detailed construction of a control unit in a local switching unit in the system shown in FIG. 6. In the figure, the same reference numerals as those in FIG. 2 represent the same parts. Reference numeral 71 denotes a multi capture control unit, 72 a multi open control unit, 73 a multi speech send out unit, and 74 a multi send out stop unit.

In operation, when there are a number of idle lines, the multi capture control unit 71 controls the ARE management data storing unit 230 to realize the one-to-one connection. When there are little idle lines, the multi capture control unit 71 controls the ARE management data storing unit 230 to realize the one-to-multiple connection.

When the designated line is the one-to-one connection line, the multi open control unit 72 controls the ARE management data storing unit 230 to open the line. When the designated line is the one-to-multiple connection, the multi open control unit 72 controls the ARE management data storing unit 230 to open the line only when the last requirement to open the line among the requirements generated by the users utilizing the ARE is generated.

When the designated line is the one-to-one connection line, the multi speech send out unit 73 controls the ARE management data storing unit 230 to output an instruction to send out speech. When the designated line is the one-to-multiple connection, the multi speech send out unit 73 controls the ARE management data storing unit 230 to output an instruction to send out speech only when the last requirement to open the line among the requirements generated by the users utilizing the ARE is generated.

When the designated line is the one-to-one connection line, the multi send out stop unit 74 controls the ARE management data storing unit 230 to stop sending out speech. When the designated line is the one-to-multiple connection, the multi send out stop unit 74 controls the ARE management data storing unit 230 to stop sending out speech only when the last requirement to stop sending out speech among the requirements generated by the users utilizing the ARE is generated.

FIGS. 8 to 10 show processing sequences (No. 1 to No. 3) for realizing the first example of the sound source management system shown in FIG. 4. Processing sequences for realizing the second example of the sound source management system shown in FIG. 5 are not shown in the drawings, however, the construction of the second example can be realized using processing sequences similar to those shown in FIGS. 7 to 9. The only difference between FIG. 4 and FIG. 5 is that, in FIG. 4, the sound source 2C is accommodated in the transit switching unit 3, while in FIG. 5, the sound source 2C is accommodated in the local switching unit 1C which is accommodated in the transit switching unit 3.

With the calling subscriber's telephone set 4, the local switching unit 1 (designated by LS unit B) and the transit switching unit 3 (designated by TS unit) being shown therein, FIGS. 8 to 10 show the processing sequences from a step in which the ARE accommodated in the transit switching unit 3 (TS unit) is captured through an interaction between a call processing unit 22 in FIG. 2 and the sound source management unit 23 so as to send out a speech until a step in which the ARE is opened.

In the processing sequence No. 1 of the embodiment shown in FIG. 8, when a speech service is called for to the LS unit B1 from the calling terminal 4 (a in FIG. 8), the calling-terminal is connected to the call processing unit 22 in the LS unit B1 so that the call processing unit 22 recognizes the service (destination for connection) requested from the calling terminal 4. As a result of this, when it is found that a sound source needs to be captured, an ARE capturing request is generated to the sound source management unit 23 (b in FIG. 8). The sound source management unit 23 actuates the ARE capture unit 232 (FIG. 2) for the request so generated, and the ARE management data storing unit 230 in FIG. 2 is retrieved. When there is no idle sound source accommodated in the own local switching-unit (LS unit B), an idle sound source accommodated in the transit switching unit (TS unit) is detected. The sound source so detected is captured as an ARE, whereupon the call processing unit 10 is notified that the capture of the sound source is completed (the notice including accommodation position information on the captured ARE accommodated in the transit switching unit or the like)(c in FIG. 7).

Thereafter, when the call processing unit 22 sends an ARE speech sending-out request to the sound source management unit 23 (d in FIG. 8), speech is sent out from the ARE through control by the ARE speech sending out unit 234 (FIG. 2), and thus a speech service is initiated (e in FIG. 8). The connection between the calling terminal 4 and the ARE of the transit switching unit (TS unit) during the speech service is effected through control by the ARE speech sending out unit 234 (FIG. 2). The sound source management unit 23 notifies the call processing unit 22 of the completion of sending out of the speech from the ARE sending-out completion notifying unit 237 (FIG. 2) when the speech has been sent out from the ARE (f in FIG. 8). On the other hand, when the call processing unit 22 directs the sound source management unit 23 to open the ARE (g in FIG. 8), the ARE is opened through the control of the ARE opening unit 233 (FIG. 2) by the sound source-management unit 23, and the call processing unit 22 is then notified of the completion of the open (h in FIG. 8). Thereafter, the calling terminal 4 cuts out the circuit (i in FIG. 8).

In the processing sequence No. 2 of the embodiment shown in FIG. 9, a speech service call is generated from the calling terminal 4 to the local-switching unit 1 (LS unit B), and the call processing unit 22 sends a sound source capturing request to the sound source management unit 23, whereby a captured speech service is provided to the calling terminal 4 by the ARE of the transit switching unit 3 (TS unit).

Thereafter, in the case of FIG. 8, when the sound source completes the sending out of the speech, the ARE is started to be opened, while in the case of FIG. 9, the caller cut out process is carried out by the calling terminal 4 (f in FIG. 9) before opening the ARE. When this cutting out request from the caller is detected by the call processing unit 22 in the local switching unit 1 (LS unit B), a directive to stop the sending out of the speech is given to the sound source management unit 23 (g in FIG. 9), and then this directive is received at the ARE sending-out stopping unit 235 (FIG. 2), whereby the sending out of the speech to the virtual ARE is stopped, and the call processing unit 22 is notified that the sending out of the speech has been stopped (h in FIG. 9). When it receives this notice, the call processing unit 22 outputs a directive to open the ARE to the sound source management unit 23 (i in FIG. 9), and when this directive is received at the ARE opening unit 233 (FIG. 2), the sound source management unit 23 performs processing such that the ARE is opened and notifies the call processing unit 22 that the open of the ARE is completed (j in FIG. 9).

In the processing sequence No. 3 of the embodiment shown in FIG. 10, a speech service call is generated from the calling terminal 4 to the local switching unit 1 (LS unit B) (a in FIG. 10), and thereafter, the same procedure is taken as those shown in FIGS. 8 and 9 until a captured speech service is provided to the calling terminal 4 by the ARE of the transit switching unit 3 (TS unit) through the processing sequence (b to e) of the call processing unit 22 and the sound source management unit 23 in the local switching unit 1 (LS unit B).

The processing sequence No. 3 shown in FIG. 10 indicates a case in which a failure affecting the operation of the ARE is found in the transit switching unit 3 (TS unit) thereafter. When a failure is detected, the sound source management unit 23 in the local switching unit 1 (LS unit B) is notified of the failure by the transit switching unit 3 (TS unit) (f in FIG. 10). When the ARE failure detection unit 236 (FIG. 2) detects this failure, the sound source management unit 23 notifies the call processing unit 22 that the speech has been sent out (g in FIG. 10), and by this notice the call processing unit 22 sends a directive to open the ARE (h in FIG. 10). The ARE opening unit 233 (FIG. 3) is actuated by this directive and the sound source management unit 23 performs processing such that the ARE is opened, and when the open of the ARE is completed, the call processing unit 22 is so notified (i in FIG. 10).

Next, referring to FIGS. 11A to 13B, processing flows will be described for realizing respective functions of the sound source management unit 23 in FIG. 2 in the local switching unit.

In the processing flows shown in FIGS. 11A to 13B, the processing function of the sound source management unit is divided into three functions carried out by the sound source management unit 23, the own resource management unit 14, and the other resource management unit 15, respectively. Reference numeral 23 denotes the sound source management unit which executes a main processing routine. The own resource management unit 14 manages an ARE accommodated in the own switching unit. The other resource management unit 15 is a mechanism for managing ARES accommodated in the transit switching unit or other local switching units connected via the transit switching unit.

FIG. 11A shows a capturing process. When receiving a directive to capture an ARE from the call processing unit 22 in FIG. 2, the sound source management unit 23 retrieves the ARE management data storing unit 230 in FIG. 2 for judgement of whether or not there is an own resource (a in FIG. 11A). When there is an own resource, a directive to capture an ARE is given to the own resource management unit 14 (b in FIG. 11A), and when the capture is completed, a response is returned (c in FIG. 11A). When there is no own resource, it is judged whether or not there are other resources (d in FIG. 11A), and when it is found that there is an idle ARE in the other resources, a directive to capture the idle ARE is given to the other resource management unit 15 (e in FIG. 11A), and a response is waited for which notifies that the capture is completed (f in FIG. 11A). When the capture of the ARE either in the own resource or in the other resource is completed, the call processing unit 22 is notified that the capture is completed (h in FIG. 11A), and when there is no idle ARE in any of the resources, the call processing unit is notified that no ARE can be captured (g in FIG. 11A).

FIG 11B shows a speech sending-out process, and when receiving from the call processing unit 22 in FIG. 2 a directive to send-out a speech from an ARE, the sound source management unit 23 identifies whether an ARE for use corresponding to the directive is an own resource or an other resource (a in FIG. 11B). If the ARE for use is identified as the own resource, a directive to send out a speech is given to the own resource management unit 14 (b in FIG. 11B) and the process waits for a response notifying that the sending out of the speech has been executed (c in FIG 11B). On the contrary, if the ARE for use is identified as the other resource, a directive to send out a speech is given to the other resource management unit 15 (c in FIG. 11B) and the process waits for a response notifying that the sending out of the speech has been executed (e in FIG. 11B). When a notice is returned which notifies from either of the management units that the speech has been sent out in response to the directive to send out a speech, the call processing unit 22 in FIG. 2 is notified of the execution of sending out of the speech (f in FIG. 11B).

FIG. 12A shows a speech sending out completion process. In this process, when receiving a notice of completion of sending out of a speech either from the own resource management unit 14 or the other resource management unit 15 (a, b in FIG. 12A), the sound source management unit 23 notifies the call processing unit 22 in FIG. 2 of the completion of sending out of the speech (c in FIG. 12A).

FIG. 12B shows an opening process. This process is actuated when an ARE opening request is received from the call processing unit 22 in FIG. 2, and the sound source management unit 23 identifies a resource in use (a in FIG. 12B). If the resource in use is identified as the own resource, the own resource management unit 14 is directed to open the sound source in use (b in FIG. 12B), while when the resource in use is identified as the other resource, the other resource management unit 15 is directed to open the resource in use (d in FIG. 12B). A response notifying of the completion of open of either of the resources is waited for (c or e in FIG. 12B), and when receiving the notice of completion of open of either of the resources, the call processing unit 22 in FIG. 2 is notified of the completion of such opening process (f in FIG. 12B).

Figure 13A:
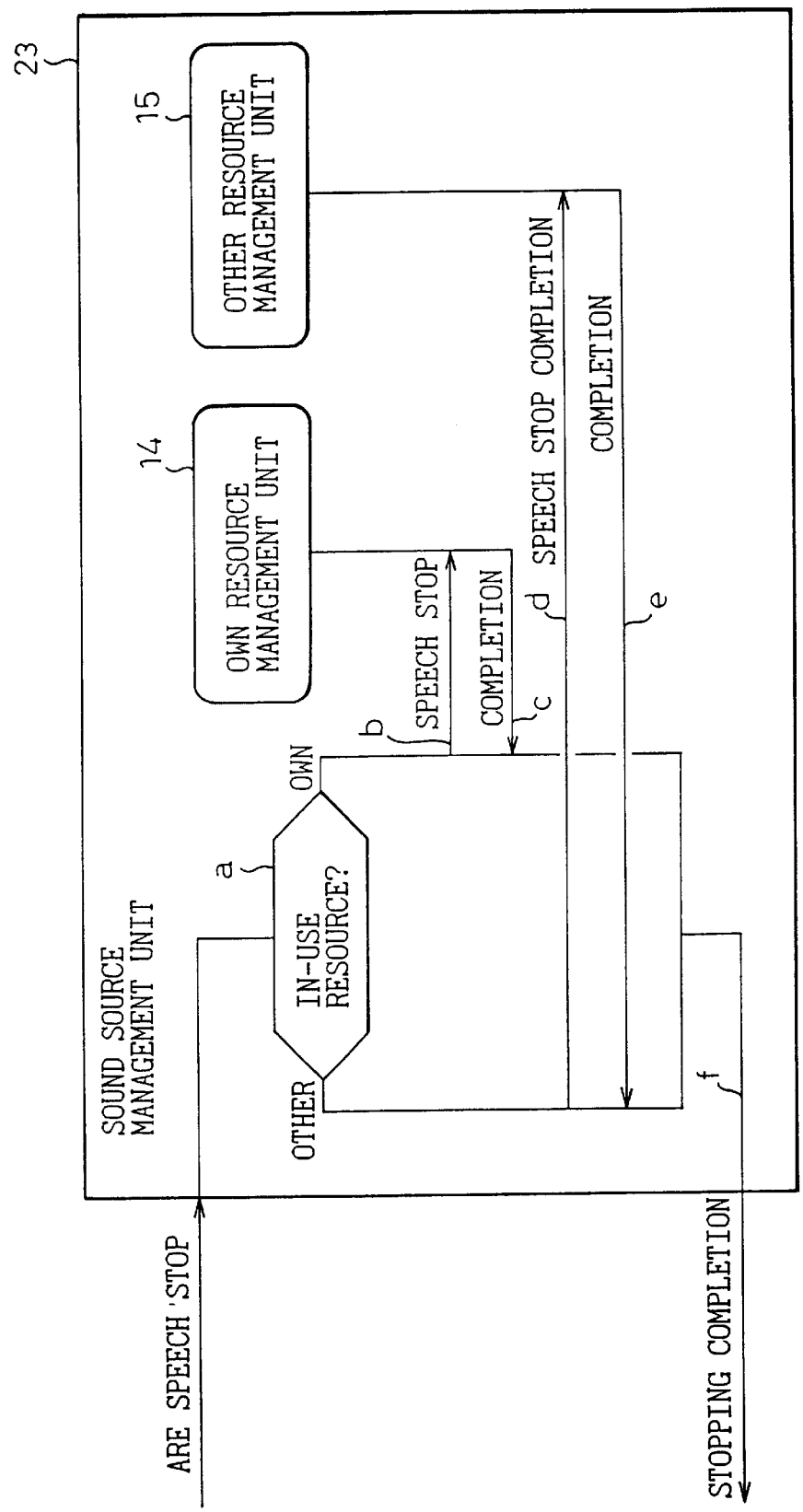
FIG. 13A is a diagram showing a process flow (No. 3) of a speech stop process by the sound source management unit.

FIG. 13A shows a speech stop process. When receiving a directive to stop the ARE speech from the call processing unit 22 in FIG. 2, the sound source management unit 23 identifies a resource in use (a in FIG. 13A). If the resource in use is identified as the own resource, the own resource management unit 14 is directed to stop the speech (b in FIG. 13A), while when the resource in use is identified as the other resource, the other resource management unit 15 is directed to stop the speech (d in FIG. 13A). When a response notifying of the completion of stop of either of the speeches is received (c or e in FIG. 13A), the call processing unit 22 in FIG. 2 is notified of the completion of stop of the speech (f in FIG. 13A).

FIG. 13B shows a failure notifying process. In this process, when an ARE failure is detected either in the own resource management unit 14 or in the other resource management unit 15 (a or b in FIG. 13B), a failure notice is sent to the ARE management unit 23 (c or d in FIG. 13B). In response to the notice, a process to cope with the failure is performed in the sound source management unit 23.

Next, FIGS. 14A to 16B show sequences between nodes (Nos. 1 to 3) of the ARE management unit.

Figure 14A:
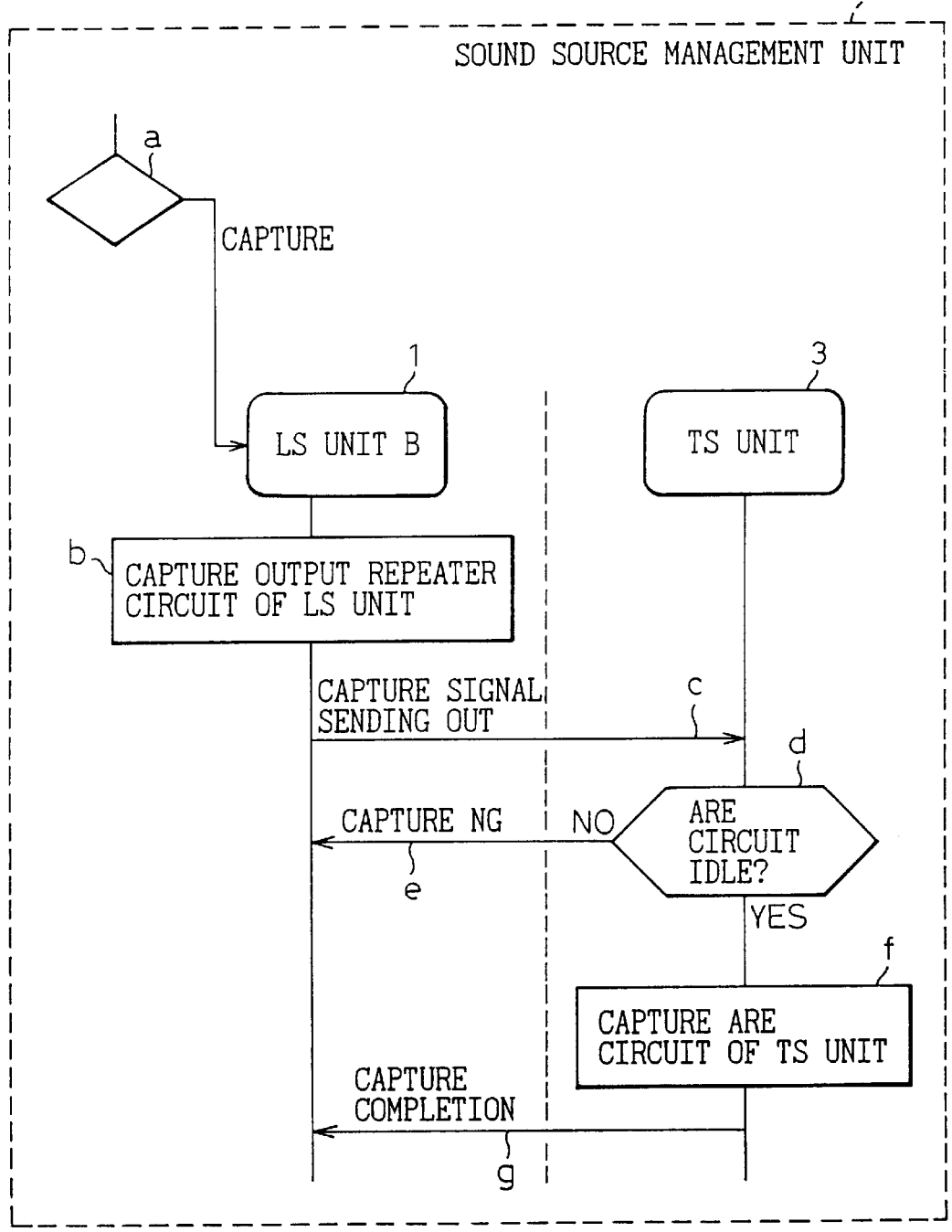
FIG. 14A is a diagram showing a sequence (No. 1) of a capturing process between nodes of the resource management unit.
Figure 14B:
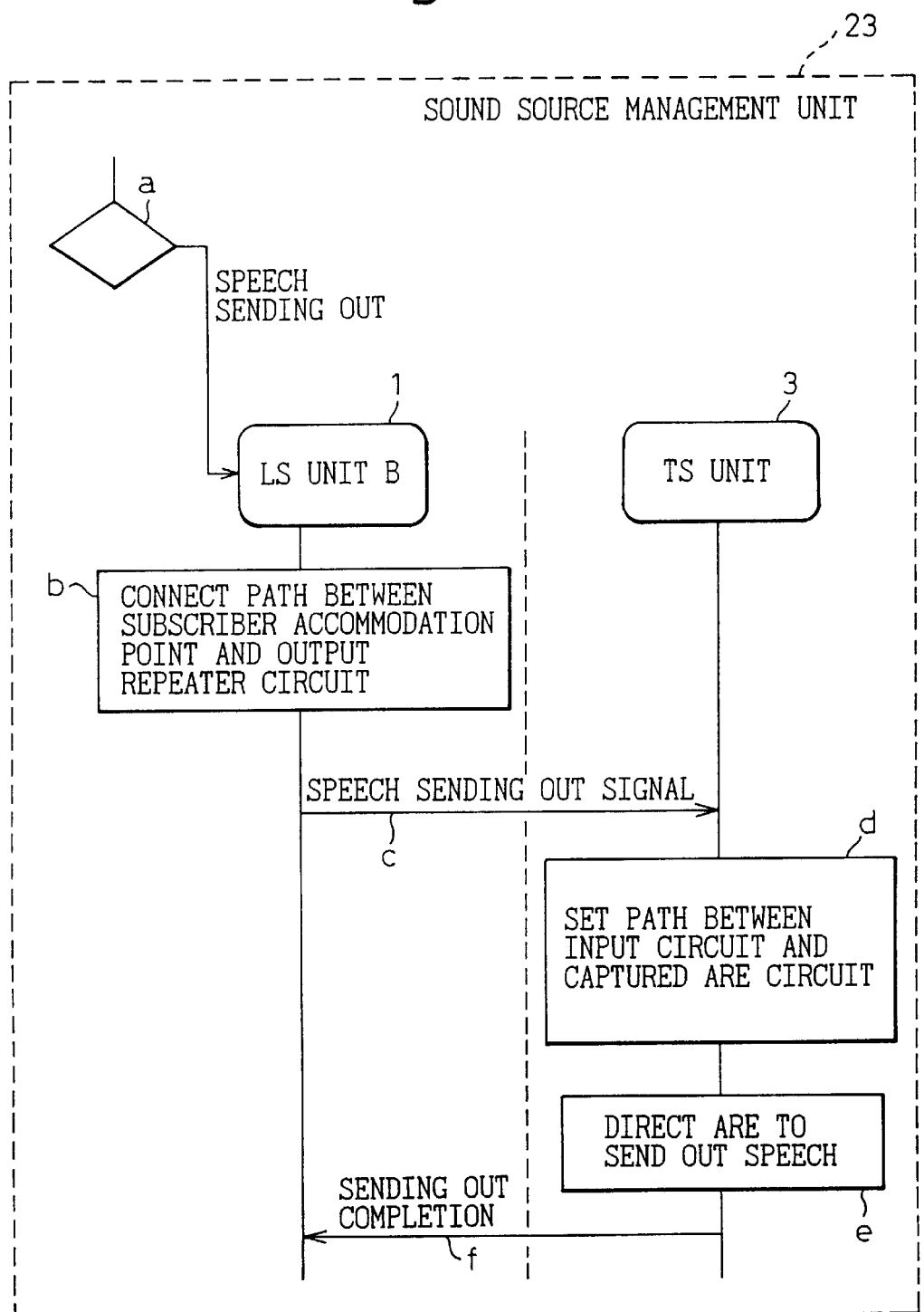
FIG. 14B is a diagram showing a sequence (No. 1) of a speech sending out process between nodes of the resource management unit.
Figure 16A:
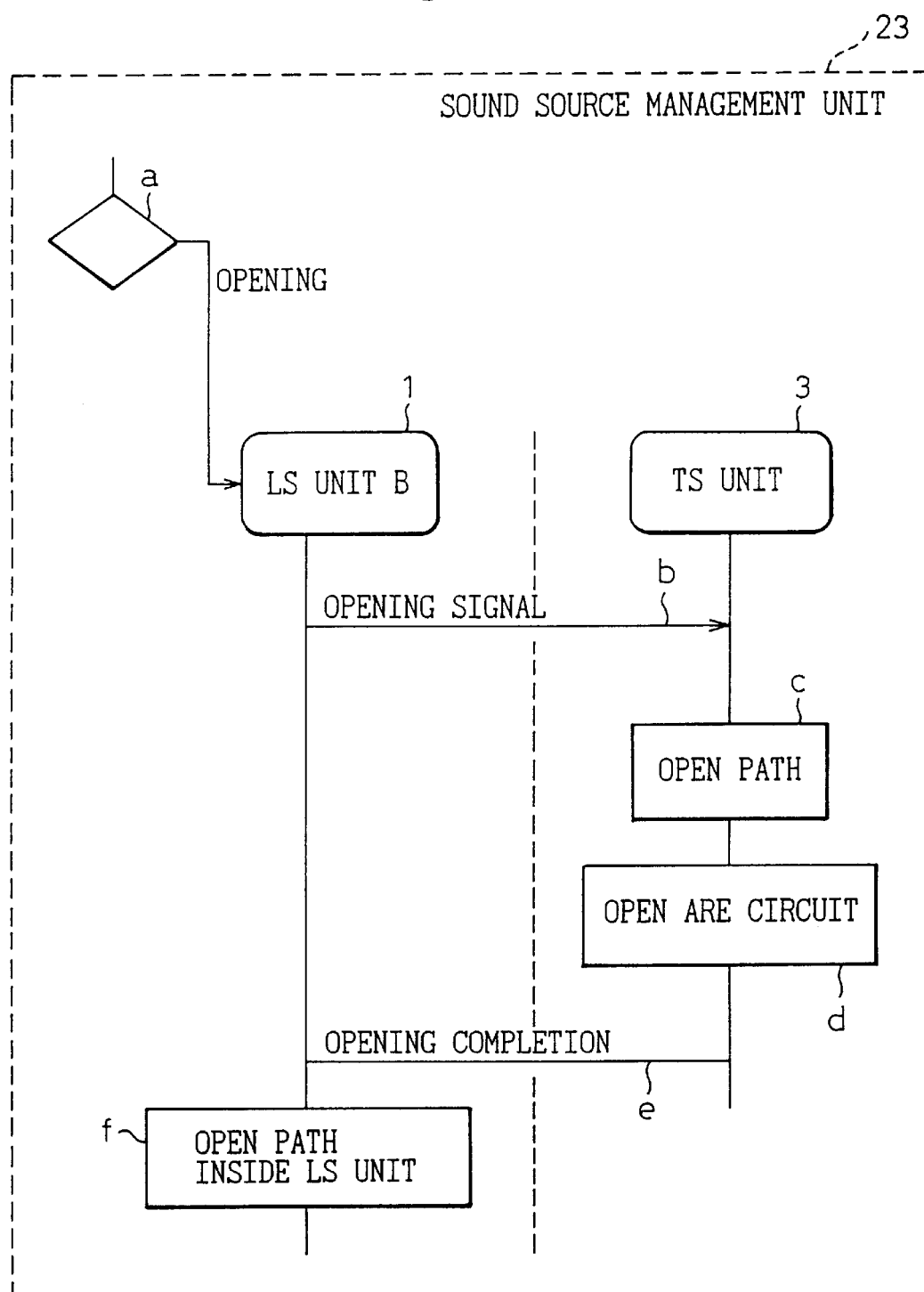
FIG. 16A is a diagram showing a sequence (No. 3) of an opening process between nodes of the resource management unit.

FIGS. 14A to 16B show sequences of a control signal sent and received between two nodes such as the local switching unit 1 (LS unit B) and the transit switching unit 3 (TS unit) in a case where a sound source (ARE) accommodated in the transit switching unit 3 (TS unit), which acts as the other switching unit, is used at the sound source management unit 23 in the local switching unit 1 (LS unit B), respective processes are a capture process shown in FIG. 14A, a speech sending-out process shown in FIG. 14B, a speech sending-out completion process shown in FIG. 15A, a speech stop process shown in FIG. 15B, an opening process shown in FIG. 16A, and a failure notification process shown in FIG. 16B.

In FIGS. 14A to 16B, since the sound source management unit 23 manages the sound sources (ARE's) accommodated in the own switching unit (LS unit B) and the transit switching unit (TS unit) all together, control signals are sent and received between nodes in order to manage the sound sources (ARE's) between the own switching unit (LS unit B) and the transit switching unit (TS unit) connected with a repeater circuit in correspondence with the respective management functions. In addition, in FIGS. 14A to 16B, the "LS unit B" represents specifically the call processing unit (FIG. 2) in the own switching unit and the "TS unit" the transit switching unit 3.

FIG. 14A shows a capture process, and when the sound source management unit 23 judges that the ARE accommodated in the TS unit 3 needs to be captured, the LS unit B (the call processing unit) is directed to capture the ARE accommodated in the TS unit (a in FIG. 14A), and the LS unit B captures an output repeater circuit of the LS unit (b in FIG. 14A). When the output circuit of the LS unit is then connected to the TS unit 3, a capture request signal for capturing the ARE is sent out (c in FIG. 14A). When an idle circuit is detected on the TS unit side, the ARE circuit accommodated in the TS unit so detected is captured, and the LS unit B is then notified that the capture of the circuit is completed (f in FIG. 14A).

FIG. 14B shows a speech sending-out process, which is executed after the ARE is captured by the transit switching unit (TS unit 3). When a directive to send out a speech is generated in the sound source management unit 23 (a in FIG. 14B), the LS unit B connects a subscriber accommodation point to the transit switching unit (TS unit) (b in FIG. 14B). Thereafter, when a speech sending-out signal is outputted from the LS unit B to the TS unit 3 (c in FIG. 14B), a path between an input circuit and the captured ARE circuit is set in the TS unit 3 (d in FIG. 14B), and a directive to send out a speech is given to the ARE, while the LS unit B is notified that the sending out of the speech is completed (f in FIG. 14B).

FIG. 15A shows a speech sending out completion process, which is generated after the ARE accommodated in the transit switching unit (TS unit 3) is captured and the sending out of a speech is executed. When a speech sending out is executed by the ARE accommodated in the TS unit 3, monitoring is carried out to judge whether or not the speech sending out is completed (a in FIG. 15A) and if it is judged that the speech is being sent out, the monitoring continues to be carried out, while when it is judged that the sending out of the speech has been completed, the LS unit B is notified that the speech sending out is completed (b in FIG. 15A).

FIG. 15B shows a speech stop process. The sound source management unit 23 directs the LS unit B to stop a speech when a call is interrupted by a subscriber terminal (on-hook or the like)(a in FIG. 15B). When being so directed, the LS unit B sends out a stop signal to the TS unit (b in FIG. 15B), and the TS unit has then judged whether or not the speech is being sent out (c in FIG. 15B). If it is judged that the speech is not sent out, the LS unit B is notified that the stop of the speech is completed (d in FIG. 15B), while it is judged that the speech is being sent out, the ARE accommodated in the relevant TS unit is directed to stop the sending out of the speech (e in FIG. 15B). Thereafter, the TS unit notifies the LS unit B that the stop of the sending out of the speech is completed (f in FIG. 15B).

FIG. 16A shows an open process. When the speech has been sent out from the sound source (ARE) accommodated in the transit switching unit (TS unit) to a subscriber terminal of the LS unit B, the sound source management unit 23 directs the LS unit B to open a path connecting to the ARE (a in FIG. 16A). When being so directed, the LS unit B sends out an opening signal to the TS unit (b in FIG. 16A), a path connecting to a subscriber terminal of the LS unit B is opened (c in FIG. 16A) at the TS unit. Next, the circuit of the ARE accommodated in the TS unit through which the speech has been sent out is opened (d in FIG. 16A). Thereafter, when the TS unit notifies the LS unit B that the ARE circuit has been opened (e in FIG. 16A), the LS unit B opens a path therein upon receipt of the notice from the TS unit (f in FIG. 16A).

FIG. 16B shows a failure notification process.

In a case where a speech is sent out from the sound source (ARE) accommodated in the transit switching unit (TS unit) to a subscriber terminal of the LS unit B, a monitoring action is carried out in the TS unit for monitoring whether or not a failure is generated in the ARE (a in FIG. 16B). When a failure is detected, the TS unit notifies the LS unit B of the failure so detected (b in FIG. 16B).

The construction for the sound source management of the first example shown in FIG. 4A and the construction for the sound source management of the second example shown in FIG. 4B can be realized with the constructions shown in FIGS. 8 to 16B.

Figure 17A:
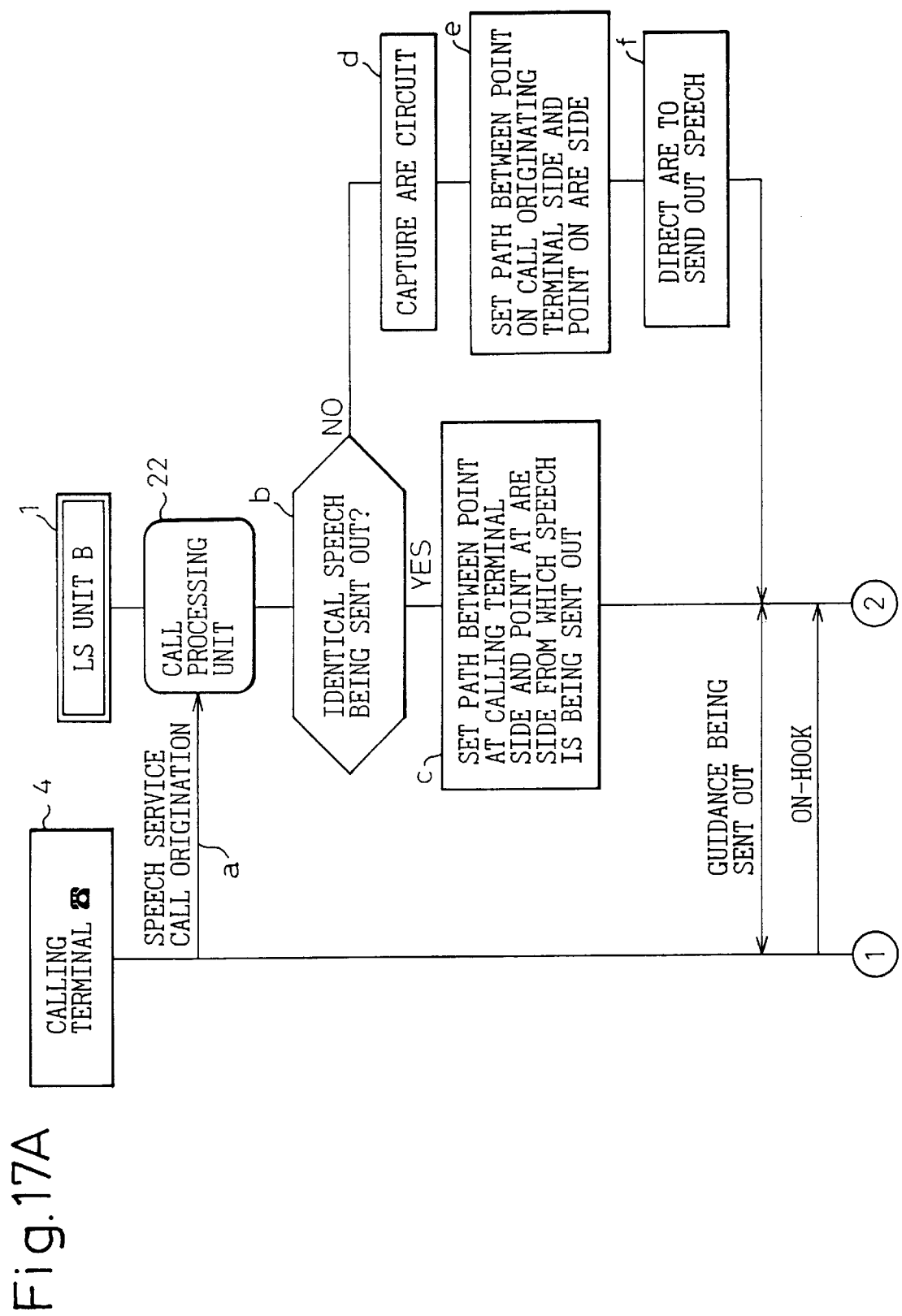
FIG. 17A is a diagram showing a prior half of a process flow for realizing the construction of the sound source management unit of the third example.
Figure 17B:
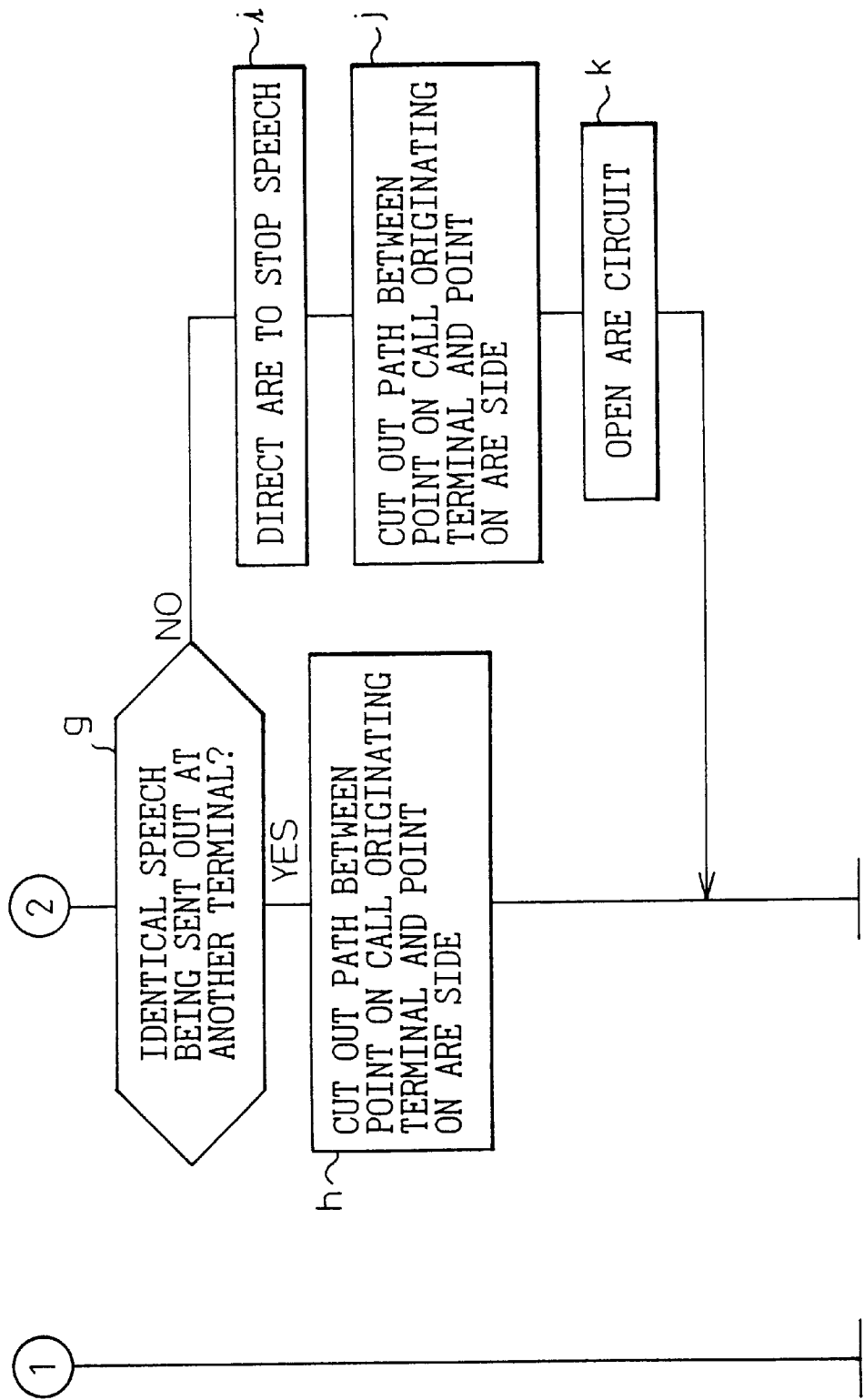
FIG. 17B is a diagram showing a latter half of the process flow for realizing the construction of the sound source management unit of the third example.
Figure 18:
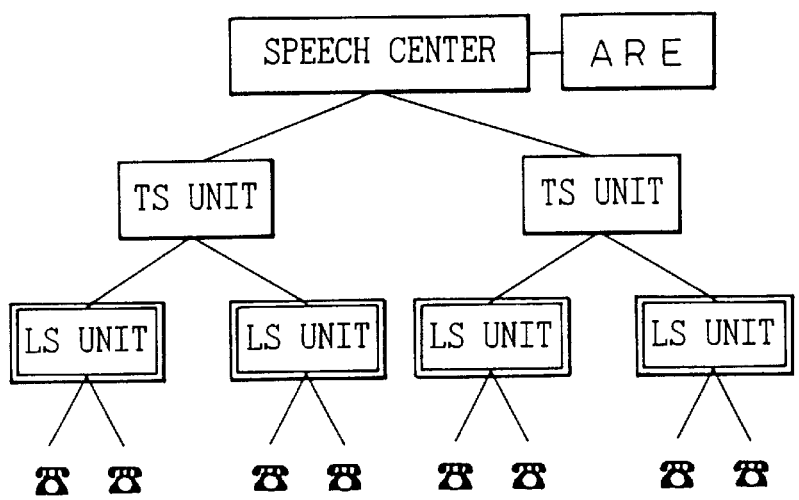
FIG. 18 is a diagram showing an example constructed such that a sound source is concentratedly disposed at a center.
Figure 19:
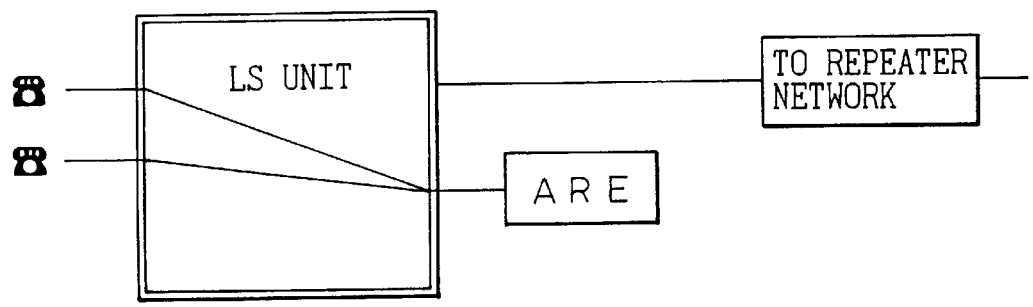
FIG. 19 is a diagram showing an example constructed such that a sound source is disposed so as to be multi-distributed to local switching units.
Figure 20:
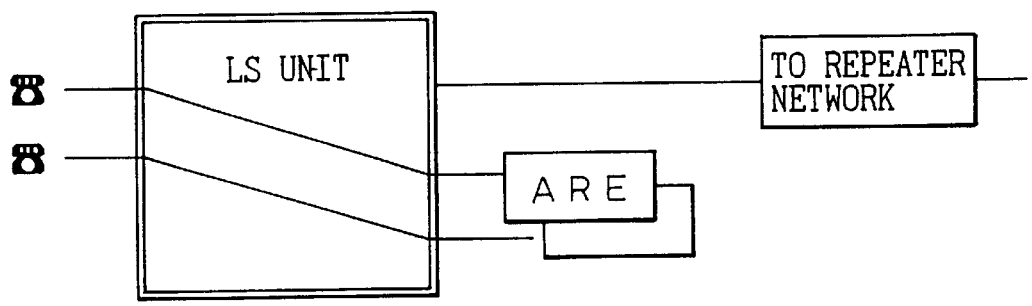
FIG. 20 is a diagram showing an example constructed such that a sound source is disposed so as to be distributed to a local switching unit on a one-to-one basis.
Figure 21:
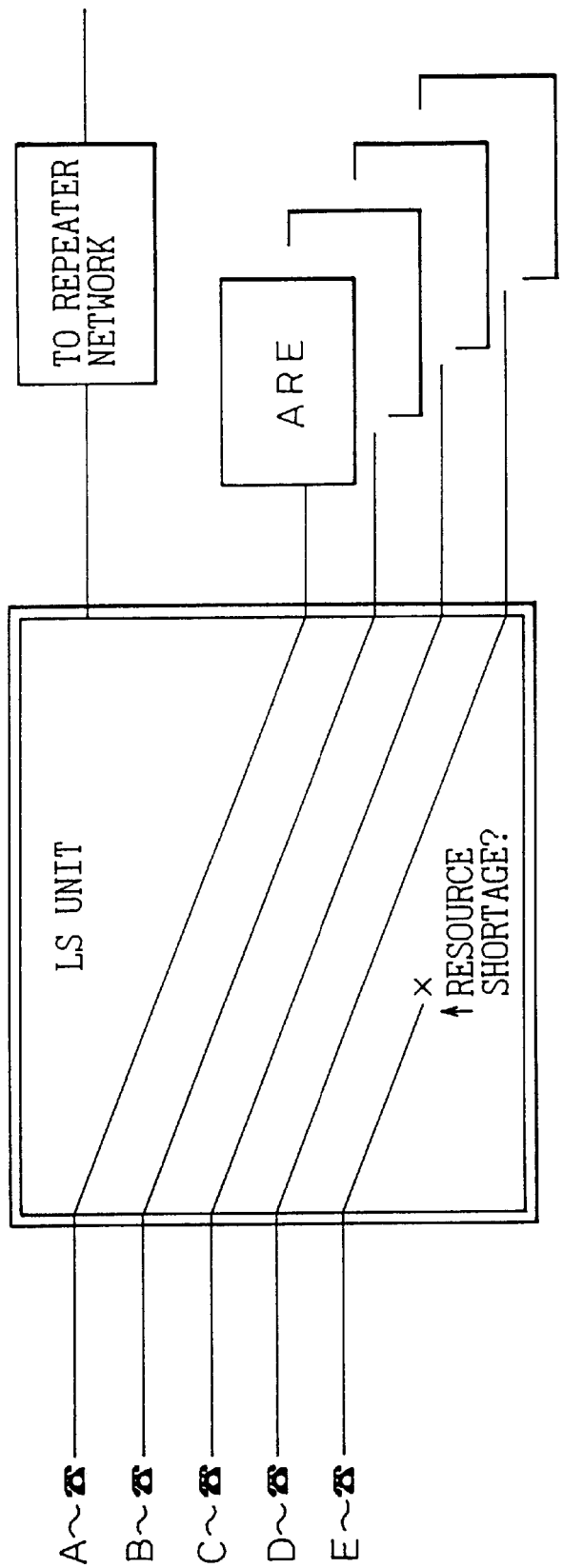
FIG. 21 is a diagram showing a state in which a speech service is congested.

FIGS. 17A and 17B show a process flow for realizing the construction for the sound source management of the third example shown in FIG. 6 above. In FIGS. 17A and 17B, reference numeral 1 denotes the local switching unit (LS unit B), 22 the call processing unit (FIG. 2), and 4 the calling terminal.

In FIGS. 17A and 17B, when the calling terminal 4 generates a call for a speech service (a in FIG. 17A), the call processing unit 22 in the LS unit B judges whether or not a speech identical to that required is being sent out from the sound source (ARE) accommodated in the own switching unit (b in FIG. 17A). When a speech identical to the required speech is not sent out, the call processing unit 22 captures the ARE circuit (d in FIG. 17A), forms a path between a point at the calling terminal side and a point at the ARE side and generates a directive to send out an ARE speech. (f in FIG. 17A), this leading to a state in which guidance is sent out. In the step b above, when an identical speech is found to be being sent out, an additional path is set between the point at the calling terminal side and the point at the ARE side where the speech is being sent out (c in FIG. 17A), this leading to a state in which guidance is being sent out.

When the user has finished listening the guidance through the calling terminal 4 and on-hooked the same, the LS unit B judges whether or not an identical speech is being sent out to another calling terminal (g in FIG. 17B). When it is judged that the identical speech is being sent out to another calling terminal, the path is cut out between the point at the calling terminal which has been on-hooked and the point at the ARE side (h in FIG. 17B). If it is found that an identical speech is not being sent out in the step g above, a directive is outputted to stop the ARE speech (i in FIG. 17B), the path is cut out between the point at the calling terminal side and the point at the ARE side (j in FIG. 17B), the ARE circuit being thereby opened (k in FIG. 17B).

According to the present invention, sound sources (ARE'S) are provided on a network comprising local switching units and a transit switching unit, and all the local switching units which are under control of the transit switching unit are managed such that each of the local switching units can share the sound sources (ARE's), thereby making it possible to eliminate a momentary resource shortage in each of the local switching units with a minor investment in equipment and facilities and without affecting the traffic of the overall network.

What is claimed is:

1. The sound source management unit for a telephone switching network, comprising:

a plurality of sound sources;

a call processing unit for processing a call from at least one subscriber; and a sound source management data storing unit for storing information representing whether or not each of said sound sources is being used, wherein when said call processing unit detects a call originated from a calling subscriber's telephone set that requests connection to one of said sound sources for a required speech, the call processing unit judges, through the utilization of said sound source management data storing unit, whether or not a speech is being sent out from the sound source that is identical to the speech required; and as a result of the judgment, if said required speech is being sent out from said requested sound source to another subscriber's telephone set, said call processing unit establishes a path between said call originating subscriber's telephone set and said requested sound source in addition to the path between said another subscriber's telephone set and said requested sound source.

2. The sound source management system according to claim 1, wherein when said call originating subscriber's telephone set is on-hooked, said call processing unit judges whether or not a speech identical to that which has been sent to said call originating subscriber's telephone set is being sent from said requested sound source to another subscriber's telephone set, and as a result of the judgment, if said speech is not being sent from said requested sound source to another subscriber's telephone set, said call processing unit directs said requested sound source to stop to send out said speech, while if said speech is being sent from said requested sound source to another subscriber's telephone set, said call processing unit cuts the path between said call originating subscriber's telephone set and said requested sound source.

* * * * *